(12) United States Patent
Nejadmalayeri

(10) Patent No.: US 10,409,093 B2
(45) Date of Patent: Sep. 10, 2019

(54) OPTICAL APPARATUS

(71) Applicant: Phoelex LTD, Cambridgeshire (GB)

(72) Inventor: Amir Hossein Nejadmalayeri, Cambridgeshire (GB)

(73) Assignee: PHOELEX LTD, Cambridgeshire (GB)

( * ) Notice: Subject to any disclaimer, the term of this patent is extended or adjusted under 35 U.S.C. 154(b) by 0 days.

(21) Appl. No.: 16/069,555

(22) PCT Filed: Jan. 11, 2017

(86) PCT No.: PCT/IB2017/050136
§ 371 (c)(1),
(2) Date: Jul. 12, 2018

(87) PCT Pub. No.: WO2017/122136
PCT Pub. Date: Jul. 20, 2017

(65) Prior Publication Data
US 2019/0018262 A1     Jan. 17, 2019

(30) Foreign Application Priority Data
Jan. 12, 2016   (GB) .................................. 1600590.2

(51) Int. Cl.
*G02F 1/01*       (2006.01)
*G02B 6/10*       (2006.01)
(Continued)

(52) U.S. Cl.
CPC ............. *G02F 1/0121* (2013.01); *G02B 6/10* (2013.01); *G02F 1/01* (2013.01); *G02F 1/011* (2013.01);
(Continued)

(58) Field of Classification Search
CPC ... G02F 1/00; G02F 1/01; G02F 1/011; G02F 1/0121; G02F 1/0123; G02F 1/025; G02F 1/03; G02F 1/035; G02F 1/07; G02F 1/17; G02F 1/21; G02F 1/225; G02F 1/2255; G02F 1/2257; G02F 2001/0151; G02F 2001/0154; G02F 2001/211;
(Continued)

(56) References Cited

U.S. PATENT DOCUMENTS 3,523,249 A * 8/1970 Palatinus .................. H04J 7/02
                                                          370/480
6,590,691 B1 * 7/2003 Nagra .................... G02F 1/2255
                                                          359/237

(Continued)

OTHER PUBLICATIONS

Cignoli, Marco et al., "22.9 A 1310nm 3D-integrated silicon photonics Mach-Zehnder-based transmitter with 275 mW multistage CMOS driver achieving 6dB extinction ratio at 256Gb/s", 2015 IEEE International Solid-State Circuits Conference—(ISSCC) Digest of Technical Papers, Feb. 22, 2015, pp. 1-3.

(Continued)

*Primary Examiner* — Loha Ben
(74) *Attorney, Agent, or Firm* — Tarolli, Sundheim, Covell & Tummino LLP

(57) ABSTRACT

We disclose herein an optical apparatus comprising an optical signal path which is driven by a plurality of electrical drivers. The electrical drivers are configured to optimize delays between two adjacent electrical drivers. The delays are optimized such that power loss in the optical apparatus is reduced.

27 Claims, 22 Drawing Sheets

(51) Int. Cl.
| | |
|---|---|
| *G02F 1/225* | (2006.01) |
| *G02F 1/025* | (2006.01) |
| *H04B 10/50* | (2013.01) |
| *G02B 6/12* | (2006.01) |
| *G02F 1/015* | (2006.01) |
| *H04B 10/54* | (2013.01) |
| *G02F 1/21* | (2006.01) |

(52) U.S. Cl.
CPC .............. *G02F 1/025* (2013.01); *G02F 1/225* (2013.01); *G02F 1/2255* (2013.01); *G02B 2006/12142* (2013.01); *G02F 2001/0151* (2013.01); *G02F 2001/0154* (2013.01); *G02F 2001/211* (2013.01); *G02F 2001/212* (2013.01); *H04B 10/5053* (2013.01); *H04B 10/541* (2013.01)

(58) Field of Classification Search
CPC ........... G02F 2001/212; G02F 2201/06; G02F 2201/08; G02F 2201/122; G02F 2201/126; G02F 2201/127; G02F 2203/00; H03C 7/02; H03C 7/025; H04B 10/00; H04B 10/04; H04B 10/06; H04B 10/12; H04B 10/508; H04B 10/60; H04B 10/677; H04B 10/5051; H04B 10/5053; H04B 10/5161; H04B 10/541; H04B 10/503; H04B 10/69; G02B 6/10; G02B 6/12007; G02B 2006/12142; G02B 2006/1215; G02B 2006/12159; G02B 27/00; H04H 14/06; H04H 14/08; H04L 27/2096; H01S 3/10; H01S 3/13; G01B 9/02; G01C 19/72
USPC ....... 359/237, 238, 245, 258, 264, 276, 279, 359/285, 286, 325, 337.22, 577, 583; 385/1–4, 14–15, 24, 27; 398/161, 183, 398/185, 187–189, 198, 202, 208–210, 398/212, 214; 356/460, 477, 481; 372/26, 29.023, 30, 31; 250/216, 227.12
See application file for complete search history.

(56) References Cited

U.S. PATENT DOCUMENTS

| | | | |
|---|---|---|---|
| 7,039,258 B2 | 5/2006 | Gunn, III et al. | |
| 7,277,645 B2* | 10/2007 | Gill .................... | G02F 1/225 398/185 |
| 7,317,846 B2 | 1/2008 | Keil | |
| 7,450,787 B2 | 11/2008 | Kucharski et al. | |
| 7,515,775 B1 | 4/2009 | Kucharski et al. | |
| 7,515,832 B2* | 4/2009 | Kikuchi ............. | H04B 10/5051 398/102 |
| 7,606,504 B2* | 10/2009 | Onaka ................. | H04B 10/60 359/325 |
| 7,657,131 B2* | 2/2010 | Liu ...................... | G02F 1/2257 385/4 |
| 7,689,074 B2* | 3/2010 | Isomura .............. | H04B 10/677 385/15 |
| 7,899,276 B2 | 3/2011 | Kucharski et al. | |
| 7,925,171 B2* | 4/2011 | Ooi ..................... | H04B 10/505 398/192 |
| 8,238,014 B2 | 8/2012 | Kucharski et al. | |
| 8,320,772 B2* | 11/2012 | Ooi ..................... | H04B 10/505 398/192 |
| 8,417,073 B2* | 4/2013 | Li ....................... | G02F 1/025 385/14 |
| 8,530,821 B2 | 9/2013 | Green et al. | |
| 8,577,191 B2 | 11/2013 | De Dobbelaere et al. | |
| 8,665,508 B2 | 3/2014 | Kucharski et al. | |
| 8,687,981 B2 | 4/2014 | Welch et al. | |
| 8,744,219 B2 | 6/2014 | Kato | |
| 8,873,968 B2* | 10/2014 | Kikuchi .............. | H04B 10/672 398/147 |
| 8,900,899 B2 | 12/2014 | Rabiei | |
| 8,929,689 B2* | 1/2015 | Metz .................. | G02F 1/011 385/1 |
| 8,989,601 B2 | 3/2015 | Temporiti Milani et al. | |
| 9,018,984 B2 | 4/2015 | Zuffada et al. | |
| 9,385,814 B2* | 7/2016 | Blumenthal ............ | H04J 14/02 |
| 10,056,975 B2* | 8/2018 | Soto ................... | H04B 10/0775 |
| 2004/0246557 A1 | 12/2004 | Lefevre et al. | |
| 2009/0297088 A1 | 12/2009 | Koh | |
| 2011/0149369 A1 | 6/2011 | Tu et al. | |
| 2012/0251032 A1 | 10/2012 | Kato | |
| 2013/0094865 A9 | 4/2013 | Pinguet et al. | |
| 2013/0176609 A1 | 7/2013 | Noguchi | |
| 2013/0344634 A1 | 12/2013 | Green et al. | |
| 2014/0061450 A1 | 3/2014 | Gill et al. | |
| 2014/0064653 A1 | 3/2014 | Gill et al. | |
| 2014/0105605 A1 | 4/2014 | Temporiti et al. | |
| 2014/0169723 A1 | 6/2014 | Kato | |
| 2014/0186028 A1 | 7/2014 | Kucharski et al. | |
| 2014/0233962 A1 | 8/2014 | Kato | |
| 2018/0081204 A1* | 3/2018 | Ma ..................... | G02F 1/035 |

OTHER PUBLICATIONS

Gill, D.M. et al., "Distributed Electrode Mach-Zehnder Modulator with Double-Pass Phase Shifters and Integrated Inductors", Optics Express, Jun. 18, 2015, vol. 23, No. 13, p. 16857.
International Search Report and Written Opinion dated Apr. 7, 2017 for corresponding International Application No. PCT/IB2017/050136.
International Preliminary Report on Patentability dated May 15, 2018 for corresponding International Application No. PCT/IB2017/050136.
Written Opinion of the International Preliminary Examining Authority dated Nov. 24, 2017 for corresponding International Application No. PCT/IB2017/050136.
Response (Demand under PCT Article 34) to International Search Report and Written Opinion filed Jun. 6, 2017 for corresponding International Application No. PCT/IB2017/050136.
Akiyama, Suguru, et al. "InP-based Mach-Zehnder modulator with capacitively loaded traveling-wave electrodes." Journal of Lightwave Technology 26.5 (2008): 608-615.
Choi, Jso-Sun, and Kwyro Lee. "Design of CMOS tapered buffer for minimum power-delay product." IEEE Journal of Solid-State Circuits 29.9 (1994): 1142-1145.
Izutsu, M., Y. Yamane, and T. Sueta. "Broad-band traveling-wave modulator using a LiNbO 3 optical waveguide." IEEE Journal of Quantum Electronics 13.4 (1977): 287-290.
Kato, Tomoaki. "InP modulators with linear accelerator like segmented electrode structure." Optical Fiber Communication Conference. Optical Society of America, 2014.
Patel, David, et al. "Design, analysis, and transmission system performance of a 41 GHz silicon photonic modulator." Optics express 23.11 (2015): 14263-14287.
Pavarelli, Nicola, et al. "Optical and electronic packaging processes for silicon photonic systems." Journal of Lightwave Technology 33.5 (2015): 991-997.
"Tree Network Topology Electrode Semiconductor Optical Modulator", last accessed Aug. 8, 2018, pp. 1-2, htp:/www.kipo.go.kr/kpo/user.tdf?a=user.etc.cyberPost.BoardUserAp&c=20 4&catmenu=m04_05_02&cp=8&np=10&pg=1&sn=62&year=2014.
Yamase, Tomoyuki, et al. "10-Gb/s in-line centipede electrode InP MZM and low-power CMOS driver with quasi-traveling wave generation." Opto-Electronics and Communications Conference (OECC), 2011 16th. IEEE, 2011.

* cited by examiner

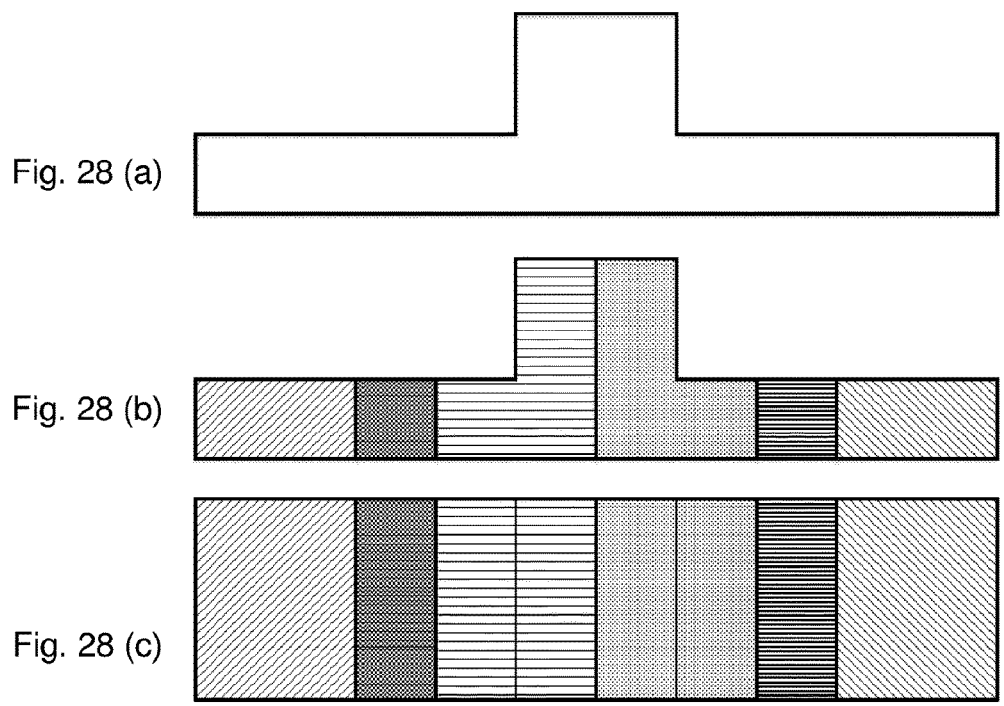
Fig. 28 (a)
Fig. 28 (b)
Fig. 28 (c)
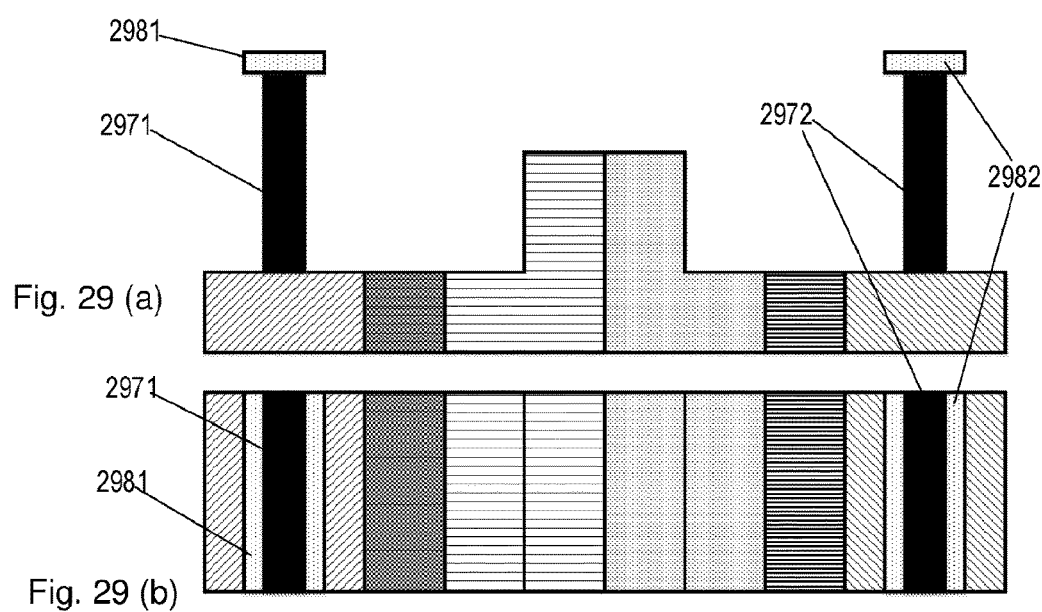
Fig. 29 (a)
Fig. 29 (b)

OPTICAL APPARATUS

RELATED APPLICATIONS

The present application is a U.S. National Stage application under 35 USC 371 of PCT Application Serial No. PCT/IB2017/050136, filed on 11 Jan. 2017; which claims priority from GB Patent Application No. 1600590.2, filed 12 Jan. 2016, the entirety of both of which are incorporated herein by reference.

FIELD OF INVENTION

The present invention relates generally to optical apparatuses, particularly but not exclusively, to optical modulators.

BACKGROUND OF INVENTION

The backbone infrastructure on which "information technology" is running, comprises two major parts, "information processing" and "information transfer". The information processing is done in electrical domain by exploiting ubiquitous transistors (subject of Shockley-Bardeen-Brattain's 1956 physics Nobel prize) which are integrated in quantities of millions to tens of billions in tiny integrated circuits (subject of Jack Kilby's 2000 physics Nobel prize). The frequencies at which these circuits are operating are normally in the range of tens of hertz (Hz) to tens of giga-hertz (GHz).

However, when it comes to the transfer of information, electrical signals exhibit major shortcomings, whereas signals at optical frequencies, i.e., frequencies in the range of hundreds of tera-hertz (THz), have significant advantages.

First, the carrier frequency of optical signals, at hundreds of THz, is far away from the peak of black body radiation curve, and as such thermal noise is almost nonexistent. Second, unlike the process of guiding electrical signals through metallic structures which is inherently lossy, the process of guiding optical signals (light) through dielectric structures is inherently lossless, and the loss observed in practice is mostly the result of manufacturing imperfections rather than any fundamental physical phenomena. This fact was the basis of optical communications which eventually led to Charles Kao's 2009 physics Nobel prize. Optical signals are transferred through dielectric waveguides that have losses in the order of fraction of decibels per kilometer (dB/km), compared to tens of dB per meter (dB/m) for metallic based transmission lines used for transferring radio frequency (RF) signals.

However, to take advantage of all unique features that optical communications offers, the electrical signals that perform "information processing" have to be somehow transferred to the optical domain. This is the subject of the field of optical modulation, which studies imparting signals at much lower frequencies to optical frequencies, to take advantage of all the good things at these extremely high frequencies offer.

To perform such modulation, certain propagation property of the optical signal is generally modified in a controllable fashion. This propagation property of the optical signal can be at least one of the following: phase, amplitude, spatial profile, polarization, chirp, phase velocity, group velocity, direction of propagation, oscillation frequency, frequency spectrum, wave vector, magnitudes of the three components of the electric field, magnitudes of the three components of the magnetic field, phases of the three components of the electric field, and phases of the three components of the magnetic field. To control the propagation property of the optical signal, an element with a controllable optical property is needed. The controllable optical property can be at least one of the following: effective index, absorption coefficient, group index, birefringence, index ellipsoid, and spatial distribution of refractive index. The apparatus through which, a propagation property of an optical signal is controlled using an input signal that adjusts the controllable optical property of an element is called an "optical modulator". If the input signal is an electrical one, it can also be called an "electro-optic modulator", an "optoelectronic modulator", or similar names understood by those skilled in the art. If the input signal is an acoustic signal, it can be called an "acousto-optic modulator".

This electrical signal can be either freely propagating, guided, or a combination thereof. For instance, a Pockels cell used in widely used titanium:sapphire (Ti:Sapph) laser amplifiers is generally a polarization modulator that upon application of proper electrical signal modifies the birefringence of a crystal, and through which the polarization state of the freely propagating beam of light. On the other hand, a telecommunication (telecom) grade lithium niobate (LiNbO$_3$) modulator comprises phase modulating sections that modify the phase of a two-dimensional guided wave optical signal through ion-exchanged formed channel waveguides in the LiNbO$_3$.

Alternatively, phase modulating a light signal traveling through a thin film based slab polymer waveguide is a combination of free space propagation in the plane of the slab, and one-dimensional wave-guiding in the direction orthogonal to the plane of the slab through the phenomenon of total internal reflection (TIR).

The major performance metrics of modulators are speed, cost, energy efficiency, and the quality of the modulated signal as quantified in multiple ways such as extinction ratio.

When designing optical modulators, multiple parameters affect the performance metrics, where major ones are the spatial profile of the optical signal, the structure of electrical port(s), the structure of the optical port(s), the nature of interaction between optical and electrical signals, and the relative position of the electrical port(s) with respect to the spatial profile of the optical signal.

As an example, in a lithium niobate modulator the nature of interaction between light and electricity is field based. In other words, the applied electrical signals generate electric fields that pass through the LiNbO$_3$ lattice. This electric field polarizes constituent atoms leading to modification of the index ellipsoid of the material through a process, commonly known as "Pockels effect" or "linear electro-optic effect". Since this whole phenomenon is done by virtue of fields, the immediate conclusion is that the spatial profile of the optical field can be optimized rather independently from the structure of the electrical structures that generate the field. Consequently, in a telecom grade LiNbO$_3$ modulator, operating at tens of GHz frequencies, where optical signal is propagating through a channel waveguide, the design of the waveguide is almost decoupled from the design of the RF electrodes that help generate the electric field in the LiNbO$_3$ lattice. This decoupling generally means that optical structure, which is a channel waveguide in this case, can almost independently from the RF transmission line electrodes be optimized. This dramatically simplifies the engineering design and optimization efforts.

However, in the case of semiconductor modulators, for instance silicon modulators, the situation is dramatically different. There, the interaction of light and electricity is done through charged particles whose movements are controlled by the applied electric signal. Since the charge transport occurs in the same material system where the optical signal is traveling, the design and optimization of the spatial profile of the optical signal and the electrical port(s) through which the movement of charged particles are controlled, are highly interrelated. Consequently, the engineering effort for design and optimization often requires making delicate tradeoffs among competing performance metrics.

As an example, normally larger carrier concentrations lead to stronger optical effects, whereas through free carrier absorption mechanism, larger concentrations mean larger attenuation of the optical signal. As another manifestation of this interdependency, one can notice that larger doping concentrations mean smaller resistivity inside the semiconductor, henceforth facilitating movement of free carriers, and eventually faster operation speed. On the flip side, larger doping concentrations detrimentally affect the attenuation of RF signals driving the electrical ports, acting as a limiting factor in the speed of operation.

A technique widely used over the past four decades to enhance the operation speed of optical modulators has been velocity matching [1]. The idea is to basically match the speed of propagating optical signal (group velocity of light) with the propagation speed of RF signal using a properly designed transmission line. This technique applied to lithium niobate platform uses modulators that are in the order of 5 cm long and form the workhorse of long-haul optical telecom links. However, the biggest disadvantage of the technique is that, it is not energy efficient.

U.S. Pat. No. 7,039,258 B2 [2] describes an optoelectronic device. This prior art only addresses the issue of speed (bandwidth). This prior art does not have the intention of obtaining energy efficiency or power efficiency.

FIG. 1 is a prior art optical modulator disclosed in U.S. Pat. No. 7,039,258. It is apparent that the electrical signals at the input electrical ports of consecutive modulator elements (M-1 to M-k) experience separate delays by using delay elements (D-1 to D-(K-1)). Therefore, if more modulator elements are used, more delay elements are necessary, which increases both complexity and energy consumption.

As we will explain in details later, the goal of our current invention is simultaneous enhancement of energy efficiency and speed (bandwidth) as two critical metrics of optical modulating systems. Our invention removes all the aforementioned limitations of the prior art by virtue of configuring the apparatus according to a specific architecture, and by doing so enables significant increase in the energy efficiency of the apparatus, while simultaneously achieving extremely high speed (bandwidth).

In U.S. Pat. No. 7,515,778 B2 [26], independent claim 1 states "each drive signal source separately energized/de-energized to control the phase shift". In the description, column 3 states "For reasons of power dissipation, it is desirable to design a modulator driver that can trade optical extinction ratio for power. Adjusting the output amplitude of most drivers to accomplish this goal is problematic; it usually results in a change in edge rate (i.e., transition time between an optical "1" and optical "0") and, depending on driver topology, might not reduce power dissipation. An alternative to adjusting the amplitude of the driver to adjust the extinction ratio is to realize that the extinction ratio is based on the phase shift between the two arms of the MZI. Therefore, it has been found that the extinction ratio of the output optical signal can be adjusted (While maintaining a constant electrical swing on the drive voltage) by dynamically adjusting the effective length of the modulated portion of the modulator structure." Again here, the requirement that all drivers have to energize/de-energize "separately" is the biggest limitation of this prior art, and we will remove this limitation as explained later to significantly reduce energy dissipation.

In the description of U.S. Pat. No. 7,515,778, it is desirable to dynamically adjust the length instead of adjusting the amplitude, and as such indeed their drivers have to be fully separate and working independently. This is a major limitation of this prior art.

In U.S. Pat. No. 8,665,508 [8], US 2014/0,186,028 [9], and U.S. Pat. No. 8,238,014 [11], multi-level PAM modulation at high speed is disclosed. However, we disclose how energy efficient as well as high speed multi-level optical modulation, including but not limited to PAM, can be achieved.

In U.S. Pat. No. 9,111,730, FIG. 13 and column 21 state "By using the high index contrast waveguide technology as described in various embodiments of this invention, it is possible to "fold" the Mach-Zehnder modulator device as shown in FIG. 13. The arms (1301) of the Mach-Zehnder modulator device are shown in FIG. 13. Preferably, the electrodes are placed with alternate voltage in order to achieve modulation. For simplification of the figure, the electrodes are not drawn in FIG. 13. It is possible to achieve traveling-wave RF electrodes in this structure, but the polarity of the wave must be alternated, as shown in FIG. 13, to function as a modulator."

U.S. Pat. No. 9,111,730 describes how to make a paper-clip structure. It also makes comments about making traveling wave electrodes for this structure. However, traveling-wave electrodes exhibiting sharp bends needed for such folded paper-clip structures experience large losses at high frequencies, in addition to all the disadvantages that have been described before. This prior art again, by virtue of previous explanations, requires high voltage drivers and as such silicon based drivers cannot be used.

The present invention offers a compact, small form-factor, very high speed, highly energy efficient, and extremely low cost solution. The present invention also relaxes the typical high voltage headroom requirements of optical modulators, which also enables the usage of low-cost silicon low-voltage high-frequency drivers.

In U.S. Pat. No. 8,744,219, independent claim 1 states "wherein an i ($1 \le i \le m$, i is an integer)-th individual driving circuit comprises: a driving circuit that outputs a signal obtained by amplifying a digital input signal in synchronization with a clock signal to an i-th waveguide-type optical phase modulator region; and a phase shift circuit that applies a delay to at least a signal branched from the clock signal and outputs the signal, . . . "

Here again, the prior art describes a structure where there exists an electrical phase shift (electrical delay) element between each consecutive modulating element.

Other references have been cited in the "References" section presented after the detailed description section and before the claims.

SUMMARY OF INVENTION

This invention discloses a general structure for extremely energy efficient high speed optical modulators. In the present invention, the original electrode is divided into sections and subsections, in order to reduce the capacitance of each individual element to as low as possible, resulting in dramatic enhancement of energy efficiency. Delays are provided between "sections" to emulate the operation of a traveling wave modulator, i.e., matching the timing of electrical and optical signals, henceforth increasing the speed (bandwidth) of the apparatus. Between "sub-sections" of a section, however, the time delays (phase changes) among the electrical signals driving the modulating elements are substantially minimised, henceforth, the overall energy efficiency of the apparatus is improved.

Broadly speaking, we disclose an optical modulator apparatus comprising an arrangement of optical signal path portions and electrical circuit portions. The optical signal path portions are operative to facilitate the propagation of optical signals. The electrical conductive line portions facilitate the coupling between the optical signals and the electrical signals. The electrical signals facilitate the adjustment of an optical property of the optical signal paths. The arrangement provides an interaction between the optical signals and the electrical signals such that the optical signals may be modulated by the electrical signals.

According to one aspect of the present invention, there is provided an apparatus comprising:
  a plurality of electrical drivers;
  at least one optical signal path comprising a plurality of sections, wherein at least one section comprises a plurality of sub-sections, wherein at least some of the plurality of sub-sections each comprises an optical modulating element, wherein at least some of the optical modulating elements each is coupled with at least one of said plurality of electrical drivers;
  wherein said each coupled electrical driver is configured to generate at least one electrical signal for modulating at least one of the propagation properties of an optical signal through said at least one optical signal path; and
  wherein the electrical drivers are configured such that delay between the electrical signals generated by at least two electrical drivers coupled with the optical modulating elements of respective sub-sections within said at least one section of said at least one optical signal path is substantially minimised.

We disclose herein an apparatus comprising: at least one optical signal path comprising a plurality of sections, wherein at least one section comprises a plurality of sub-sections, wherein at least some of the plurality of sub-sections each comprise an optical modulating element; at least one electrical driver coupled with the optical modulating element of said at least some of the sub-sections of said at least one section of said at least one optical signal path, wherein said each coupled electrical driver is configured to generate at least one electrical signal for modulating a propagation property of an optical signal through said at least one optical signal path; and wherein the electrical drivers are configured such that delay between the electrical signals generated by at least two electrical drivers coupled with the optical modulating elements of respective sub-sections within said at least one section is substantially minimised.

The propagation property of the optical signal may be at least one of the following: phase, amplitude, spatial profile, polarization, chirp, phase velocity, group velocity, direction of propagation, oscillation frequency, frequency spectrum, wave vector, magnitudes of the three components of the electric field, magnitudes of the three components of the magnetic field, phases of the three components of the electric field, and phases of the three components of the magnetic field.

The optical signal may be a freely propagating wave. Alternatively, the optical signal may be a guided wave. In this case, the optical signal path may be a waveguide that may provide, at least partially, spatial confinement of the optical signal in at least one dimension.

The apparatus is directed to optical modulating elements and optical modulators. In one example, the optical path may comprise a plurality of sections and then each section of the optical modulating element may be divided into sub-sections. Each sub-section may comprise a modulating element that may be directly coupled with or directly connected to a separate electrical driver. Alternatively, one modulating element may be connected to two or more electrical drivers. In one example, one or more modulating elements may not be connected to an electrical driver. Each electrical driver (which is directly coupled with the respective optical modulating element) may generate an electrical signal that can drive the coupled optical modulating element within the respective sub-section. Therefore, each section of the optical signal path may be coupled with a plurality of drivers. It will be appreciated that the delay between two electrical signals generated by the aforementioned two electrical drivers coupled with optical modulating elements within adjacent sub-sections within a section is substantially minimised.

Here the term "substantially minimised" means there is almost no time delay difference (or a zero time difference) between them or a significantly smaller time delay difference between them compared to the time that the optical signal needs to travel the length of the section. As an example, if the length of a section of an optical signal path is $L_s$, and the group velocity of light within the section is $v_g$, the time-of-flight of an optical signal through the section is given by $t_f = L_s/v_g$. The time delay $\Delta t$ between sub-sections of this section of the optical signal path may be considered "substantially minimised" in the context of the current invention when the absolute value of the time delay is smaller than or equal to seventy percent of the time-of-flight through the section. In mathematical parlance, the time delay is considered "substantially minimised" when $|\Delta t| \leq 0.7\, t_f$.

The optical signal path may further comprise at least one group or division comprising at least two of said plurality of sections.

The apparatus may further comprise electrical circuit comprising the plurality of electrical drivers.

The electrical circuit may comprise at least one electrical signal input port and a plurality of electrical signal output ports. The number of electrical signal output ports may be equal to or greater than the number of subsections each comprising one optical modulating element of the optical signal path.

The at least one electrical signal input port may be configured to supply an electrical signal to optical modulating elements within the at least one group of the optical signal path.

Separate electrical signal input ports may be provided for separate groups of the optical signal path.

The apparatus may further comprise at least one delay element between drivers driving the respective coupled modulating elements of at least two sections of the optical signal path.

The delay element may be configured to control the delay between the said electrical signals generated by the electrical drivers driving the respective coupled optical modulating elements of two sections of the optical signal path. The delay element may be configured such that the delay between at least two of said electrical signals generated by drivers driving the respective coupled optical modulating elements within one section of the optical signal path is substantially minimised. The delay element may be configured to provide a substantially constant delay between said electrical signals generated by drivers driving the respective coupled optical modulating elements within each section of the optical signal path. The delay element may be configured to provide a controllable delay between said electrical signals generated by drivers driving the respective coupled optical modulating elements within each section of the optical signal path.

The delay element may comprise electronic delay circuitry. Alternatively, the delay element may be a passive delay element comprising a transmission line.

The optical modulating elements each may comprise a controllable optical property. The controllable optical property may be at least one of the following properties, of refractive index, absorption coefficient, birefringence, index ellipsoid, a combination of refractive index and absorption coefficient, a combination of birefringence and absorption coefficient, and a combination of index ellipsoid and absorption coefficient.

The optical signal path may comprise an optical waveguide.

The optical signal propagating through the optical signal path may not be a guided wave.

The electrical drivers coupled with at least two subsections within the at least one section of the optical signal path may be synchronised with one another.

The electrical circuit may comprise an electrical network selected from a group comprising at least one of the following topologies: Daisy Chain network, Line network, Bus network, Tree network, and Star network.

The optical modulating element may comprise a semiconductor material. The semiconductor material may comprise at least one of the following materials: silicon, germanium, silicon germanium, gallium arsenide, indium phosphide, and gallium nitride.

The optical modulating element may comprise a ferroelectric crystal material. The ferroelectric crystal material may comprise at least one of the following materials: Lithium Niobate, Barium Titanate, and Potassium Titanyl Phosphate.

The optical modulating element may comprise a material comprising electro-optic polymer.

The optical signal path may comprise a meandered shape.

The electrical drivers may be formed on an electrical chip and the optical modulating elements are formed on an optical chip. The electrical chip and optical modulating elements may be connected using at least one of the following techniques: copper pillar technique, flip-chip bonding technique, through-silicon via (TSV) technique, and fan-out wafer level packaging (FOWLP) technique.

The electrical drivers and the optical modulating elements may be formed on the same chip.

The optical chip may comprise passive electrical elements comprising at least one electrical transmission line.

The optical modulating element may comprise a p-n semiconductor structure comprising electrical signal ports.

The optical modulating element may comprise a p-i-n semiconductor structure comprising electrical signal ports, wherein the p-i-n structure comprises an intrinsic layer sandwiched between the p and n regions.

The optical modulating element may comprise at least four semiconductor regions, the first semiconductor region being adjacent to the second semiconductor region, and the third semiconductor region being adjacent to the fourth semiconductor region.

The first and fourth regions may comprise n-type semiconductors, and the second and third regions may comprise p-type semiconductors.

The first and fourth regions may comprise p-type semiconductors, and the second and third regions may comprise n-type semiconductors.

The apparatus may further comprise two optical signal paths. The first optical signal path may comprise the first and second semiconductor regions, and the second optical signal path may comprise the third and fourth semiconductor regions.

The optical modulating element may comprise at least two electrical signal ports.

The optical modulating element may comprise at least six semiconductor regions, the fifth semiconductor region being sandwiched between the first and second semiconductor regions, and the sixth semiconductor region being sandwiched between the third and fourth semiconductor regions.

The fifth and sixth regions may comprise intrinsic semiconductors.

The first and fourth regions may comprise n-type semiconductors, and the second and third regions may comprise p-type semiconductors.

The first and fourth regions may comprise p-type semiconductors, and the second and third regions may comprise n-type semiconductors.

The apparatus may further comprise two optical signal paths. The first optical signal path may comprise the first, second and fifth semiconductor regions, and the second optical signal path may comprise the third, fourth and sixth semiconductor regions.

The optical modulating element may comprise at least two semiconductor regions and a trench region formed between the two semiconductor regions. The trench region may be at least partially filled with polymers having Pockels effect.

The optical modulating element may comprise first, second and third semiconductor regions laterally adjacent to one another, and a first trench region may be formed between the first and second semiconductor regions, and a second trench region may be formed between the second and third semiconductor regions. The first and second trench regions may be at least partially filled by polymers with Pockels effect.

The optical signal path may comprise a first portion and a second meandered portion. The first portion may comprise at least some of the plurality of optical modulating elements each comprising first and second electrical input ports, and the second meandered portion may comprise at least one other of the plurality of optical modulating elements each comprising first and second electrical input ports. In other words, the first portion may comprise two or more optical modulating elements from the plurality of optical modulating elements, and the second portion may comprise at least one or more other modulating elements from the plurality of optical modulating elements.

The second meandered portion may be bent in about 180° in respect of the first portion.

The signal polarity of the first and second electrical input ports located within the first portion of the optical signal path may be opposite to the signal polarity of the first and second electrical input ports of the second meandered portion of the optical signal path.

The optical modulating element may comprise a ferroelectric crystal material. The ferroelectric crystal material may comprise at least one of the following materials: Lithium Niobate, Barium Titanate, and Potassium Titanyl Phosphate.

An optical modulator incorporating the apparatus as described above.

We disclose herein an optical modulation system comprising:
- a signal processor;
- the optical modulator as described above;
- wherein the signal processor and the optical modulator are coupled with one another.

According to a further aspect of the present invention, there is provided an optical modulation system comprising:
- a plurality of electrical drivers;
- at least one optical modulator comprising at least one optical signal path comprising a plurality of sections, wherein at least one section comprises a plurality of sub-sections, wherein at least some of the plurality of sub-sections each comprises an optical modulating element, wherein at least some of the optical modulating elements each is coupled with at least one of said plurality of electrical drivers;
- wherein said each coupled electrical driver is configured to generate at least one electrical signal for modulating at least one of the propagation properties of an optical signal through said at least one optical signal path,
- wherein the electrical drivers are configured such that delay between the electrical signals generated by at least two electrical drivers coupled with the respective optical modulating elements of respective sub-sections within said at least one section of said at least one signal path is substantially minimised; and
- a signal processor.

The signal processor and the electrical driver may be formed on the same chip.

According to a further aspect of the present invention there is provided an apparatus for generating a modulated optical signal, the apparatus comprising:
- a plurality of electrical drivers;
- at least one optical signal path comprising a plurality of groups, wherein at least one group comprising a plurality of sections, wherein at least one section comprising a plurality of sub-sections, wherein at least some of the plurality of sub-sections each comprises an optical modulating element, wherein at least some of the optical modulating elements each is coupled with at least one of said plurality of electrical drivers;
- wherein said each coupled electrical driver is configured to generate at least one electrical signal for modulating at least one of the propagation properties of an optical signal through said at least one optical signal path; and
- wherein the electrical drivers are configured such that delay between the electrical signals generated by at least two electrical drivers coupled with the optical modulating elements of respective sub-sections within said at least one section within said at least one group of said at least one optical signal path is substantially minimised.

The apparatus may further comprise at least one delay element between electrical drivers driving the respective coupled modulating elements of at least two sections within said at least one group of said at least one optical signal path.

The apparatus may further be configured to provide some delay between said electrical signals driving the respective coupled modulating elements of at least two sections within said at least one group of said at least one optical signal path.

The apparatus may further be configured to form a part of an optical interferometer.

The apparatus may be configured to generate at least one of the following modulated optical signals: M-ary phase shift keying (M-ary PSK), multi-level phase modulation, M-ary quadrature amplitude modulation (M-ary QAM), and M-ary amplitude shift keying (M-ary ASK) modulated optical signal.

The apparatus may be configured to generate multi-level pulse amplitude modulated (PAM) optical signal.

Separate electrical signal input ports may be provided for separate groups.

The controllable optical property may comprise at least one of the following properties: refractive index, absorption coefficient, birefringence, index ellipsoid, a combination of refractive index and absorption coefficient, a combination of birefringence and absorption coefficient, and a combination of index ellipsoid and absorption coefficient.

We disclose herein a Mach-Zehnder interferometer comprising:
- an optical splitter comprising at least one input waveguide and at least two output waveguides;
- an optical recombiner comprising at least two input waveguides and at least one output waveguide;
- at least two interferometer arms, each optically coupled between one of the output waveguides of the optical splitter and one of the input waveguides of the optical recombiner, wherein at least one arm comprises the apparatus as described above.

We also disclose herein a Sagnac interferometer comprising:
- an optical splitter/combiner comprising at least one input waveguide and at least two input/output waveguides;
- at least one interferometer arm, each optically coupled between one of said at least two input/output waveguides of the optical splitter/combiner and another one of said at least two input/output waveguides of the optical splitter/recombiner,
- wherein at least one interferometer arm comprises the apparatus as described above.

The element to which we refer as splitter/combiner is an element that may exhibit functionalities of both a splitter and a combiner. In scientific parlance, this element may be a "bidirectional coupler", that can work in both directions, and as such, provides both functionalities of splitting and combining.

The element to which we refer as input/output waveguide is a waveguide through which optical signals may propagate in both directions.

According to a further aspect of the present invention, there is provided a Mach-Zehnder interferometer comprising:
- an optical splitter comprising at least one input waveguide and two output waveguides;
- an optical recombiner comprising two input waveguides and at least one output waveguide;
- a pair of interferometer arms, each optically coupled between one of the output waveguides of the optical splitter and one of the input waveguides of the optical recombiner, wherein at least one arm comprises a plurality of sections, wherein at least one section comprises a plurality of sub-sections;
- a plurality of electrical drivers each configured to generate at least one electrical signal for modulating at least one of the propagation properties of an optical signal through the interferometer arms, wherein each electrical driver is coupled with at least one sub-section of the at least one section of the at least one arm; and wherein the electrical drivers are configured such that delay between the electrical signals generated by at least two electrical drivers coupled with the respective sub-sections within the at least one section of at least one arm is substantially minimised.

The Mach-Zehnder interferometer may further comprise at least one delay element between two sections of at least one of the optical signal paths.

At least one arm may further comprise a plurality of groups.

The Mach-Zehnder interferometer may further comprise electrical circuit comprising the plurality of electrical drivers.

The electrical circuit may comprise at least one electrical signal input port and a plurality of electrical signal output ports.

Separate electrical signal input ports may be provided for separate groups of the arms.

The first group may comprise more sections of the arm compared to the second group.

In one example, the first group may comprise four sections and the second group comprises two sections, each section comprising at least two sub-sections.

The modulation strength of the first group may be twice the modulation strength of the second group.

A first electrical signal input port may be coupled with the first group and a second electrical signal input port may be coupled with the second group.

According to a further aspect of the present invention, there is provided an apparatus comprising:

a plurality of electrical drivers;

at least one optical signal path, wherein said at least one optical signal path comprises a plurality of sections, wherein at least one section comprises a plurality of sub-sections, wherein at least some of the plurality of sub-sections each comprises an optical modulating element, wherein at least some of the optical modulating elements each is coupled with at least one of said plurality of electrical drivers;

wherein said each coupled electrical driver is configured to generate at least one electrical signal for modulating at least one of the propagation properties of an optical signal through said at least one optical signal path;

wherein the apparatus is configured such that delay between the electrical signals generated by at least two electrical drivers coupled with the respective sub-sections within said at least one section of said least one optical signal path is substantially minimised, and wherein the optical modulating element of at least one sub-section of said at least one optical signal path comprises at least two semiconductor regions and a trench region formed between the two semiconductor regions.

At least one trench region may be at least partially filled with polymers having Pockels effect.

The optical modulating element may comprise first, second and third semiconductor regions adjacent to one another, and a first trench region may be formed between the first and second semiconductor regions, and a second trench region may be formed between the second and third semiconductor regions.

The first and second trench regions may be at least partially filled with polymers with Pockels effect.

The modulating elements may further comprise an electrical signal input port coupled with each semiconductor region.

The input ports associated with the first and third semiconductor regions may be coupled with one output port of the electrical driver and the input port associated with the second semiconductor region may be coupled with another output port of the electrical driver.

According to a further aspect of the present invention there is provided an apparatus comprising:

a plurality of electrical drivers;

at least one optical signal path, wherein said at least one optical signal path comprises at least two portions, a first portion and a second meandered portion, wherein each portion of said at least one optical signal path comprises at least one section, wherein at least one section comprises a plurality of sub-sections, wherein at least some of the plurality of sub-sections each comprises an optical modulating element, wherein at least some of the optical modulating elements each is coupled with at least one of said plurality of electrical drivers;

wherein said each coupled electrical driver is configured to generate at least one electrical signal for modulating at least one of the propagation properties of an optical signal through said at least one optical signal path;

wherein the apparatus is configured such that delay between said electrical signals generated by at least two electrical drivers coupled with the optical modulating elements within respective sub-sections within said at least one section of said at least one portion of said at least one optical signal path is substantially minimised, and wherein the optical modulating element of at least one sub-section of said at least one section of said each at least two portions of said at least one optical signal path comprises a first electrical input port and a second electrical input port.

The second meandered portion of the optical modulating element may be bent in about 180° in respect of the first portion of the optical modulating element.

The signal polarity of the first and second electrical input ports of the first portion of the optical modulating element may be opposite to the signal polarity of the first and second electrical input ports of the second meandered portion of the optical modulating element.

The optical modulating element may comprise a material with Pockels effect.

The material with Pockels effect may comprise at least one of the following materials: Lithium Niobate, Barium Titanate, Potassium Titanyl Phosphate, Gallium Arsenide, indium phosphide, or electro-optic polymers.

According to a further aspect of the present invention, there is provided a method of manufacturing an apparatus, the method comprising:

forming an optical signal path;

dividing the optical signal path into a plurality of sections, dividing at least one section into a plurality of sub-sections, forming an optical modulating element within each sub-section;

providing a plurality of electrical drivers each generating at least one electrical signal for modulating at least one of the propagation properties of an optical signal through the optical signal path;

coupling each optical modulating element with at least one of the plurality of electrical drivers; and providing substantially minimised delay between the electrical signals generated by at least two electrical drivers driving the optical modulating elements of respective sub-sections within said at least one section of the optical signal path.

The method may further provide at least one electrical delay element between electrical drivers driving two sections of the optical signal path.

The method may further provide at least some delay between electrical signals driving the respective coupled optical modulating elements within at least two sections of the optical signal path.

The method may further comprise forming the electrical drivers on an electrical chip and forming the optical modulating elements on an optical chip.

The method may further comprise connecting the electrical chip and optical modulating elements using at least one of the following techniques: copper pillar technique, flip-chip bonding technique, through-silicon via (TSV) technique, or fan-out wafer level packaging (FOWLP) technique.

Alternatively, the electrical drivers and the optical modulating elements may be formed on the same chip.

BRIEF DESCRIPTION OF THE DRAWINGS

In order that the invention may be more fully understood, a number of embodiments of the invention will now be described, by way of example only, with reference to the accompanying drawings, in which:

FIG. 28 depicts an exemplary embodiment prior to and in the process of forming an optical modulating element;

FIG. 29 depicts an exemplary embodiment of an optical modulating element;

DETAILED DESCRIPTION OF PREFERRED EMBODIMENTS

Figure 1:
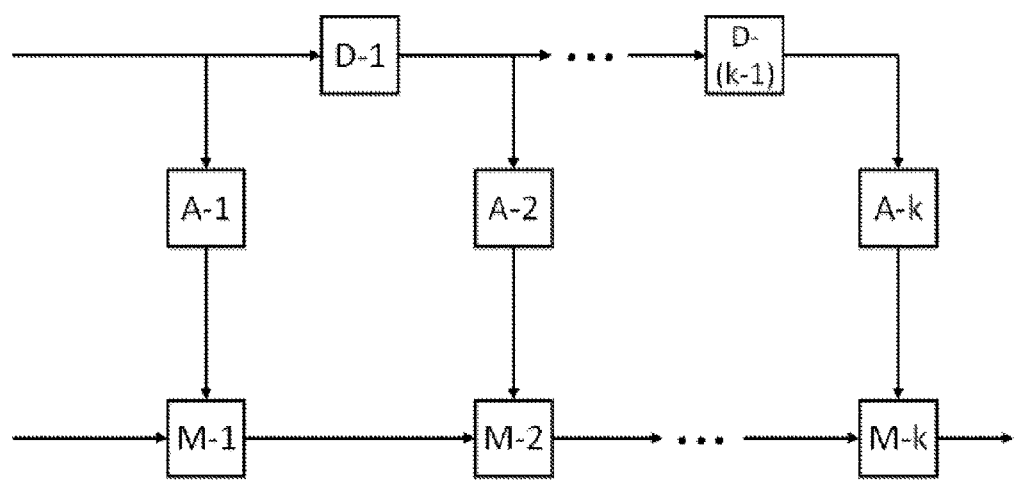
FIG. 1 is a prior art optical modulator disclosed in U.S. Pat. No. 7,039,258.

The invention will be described in respect of general theory of the invention first and then will be described in respect of various preferred embodiments.

The group velocity limited bandwidth (BW) of a traveling wave optical modulator is given by the following approximate relation [1], $$BW \simeq \frac{1.4c}{\pi L |n_g - n_{RF}|}$$

in which BW is the modulator bandwidth in hertz (Hz), c is the vacuum speed of light, L is the interaction length of the modulator (the length along which optical and RF fields travel together), $n_g$ is the group index of the optical field and $n_{RF}$ is the group index of the RF field, which are related to the propagation velocities of the optical ($v_g$) and RF ($v_{RF}$) fields, through following relations, $$v_g = c/n_g$$

and $$v_{RF} = c/n_{RF}.$$

As it is evident, in order to obtain wideband operation (large values of BW), one should either decrease the length L or bring the values of $n_g$ and $n_{RF}$ close to each other.

To get better understanding, two examples are considered below.

Modulators made out of $LiNbO_3$ and with waveguides fabricated using ion exchange process, which have been the workhorse of long haul optical communication systems for over 3 decades, have the following typical parameters:
  group index of optical signal $n_g \cong 2.2$
  index of RF signal $n_{RF} \cong 4.2$.

On the other hand, silicon modulators, which have high index contrast waveguides, have the following typical parameters:
  group index of optical signal $n_g \simeq 4.1$
  index of RF signal $n_{RF} \simeq 2.6$.

The estimated velocity mismatched limited bandwidth (the actual BW limited by other factors such as loss or dispersion can be smaller) using the above equation and typical parameters, for a range of lengths for these two types of modulators, are summarized below:

| Material | Length | | | | | | |
|---|---|---|---|---|---|---|---|
| | 30 mm | 10 mm | 3 mm | 1 mm | 300 µm | 100 µm | 30 µm |
| $LiNbO_3$ (GHz) | 2.2 | 6.7 | 22 | 67 | 220 | 670 | 2200 |
| Si (GHz) | 3 | 9 | 30 | 90 | 300 | 900 | 3000 |

As it is clearly seen, for typical commercial $LiNbO_3$ modulators whose lengths are in the range of 3 to 7 cm, it is generally desired to get the respective refractive indices of optical and RF fields closer together, in order to increase the BW to values in the range of 30 GHz, necessary for telecom applications. And this is indeed the approach which has been taken for over 3 decades to extend the bandwidth of $LiNbO_3$ modulators. Significant engineering effort (for example by exploiting thin low dielectric constant buffer layer between electrode and lithium niobate substrate with precise thickness control) has been performed to change the value of $n_{RF}$ from around 4.2 to about 2.2, so that the BW can approach the 30 GHz range.

This velocity matching is a well-established technique which has been widely used in optical communication systems. Nonetheless, the reason that this technique is applicable to material platforms such as $LiNbO_3$, as explained before, is the mere fact that optical waveguide and RF electrode can be almost independently designed and optimized.

However, with the advent of high speed semiconductor based modulators over a decade ago, this shortcoming of velocity matching technique became apparent. In semiconductors where the optical modulation is performed through charge transport mechanisms, instead of field based phenomena, the independent design and optimization of optical waveguide and RF electrode, henceforth matching their respective group velocities, is extremely difficult, if not altogether impossible.

Having known this shortcoming, careful examination of the above BW equation and the typical values in the table, suggests an alternative to engineered matching of the velocities of optical and RF fields. This alternative idea is basically breaking a long electrode to multiple sections, where the bandwidth of each section is large. For instance, if one breaks a 3 mm long lithium niobate modulator to 10 sections, each 0.3 mm long, the group velocity limited BW of each section is roughly 220 GHz, more than enough for all current commercial applications. It is interesting to note that this large bandwidth is obtained with no special engineering effort in matching the velocities of optical and RF fields.

We refer to the documents such as U.S. Pat. No. 7,039,258 B2 [2], U.S. Pat. No. 7,515,778 B2 [26], U.S. Pat. No. 9,111,730 B2 [31], and U.S. Pat. No. 8,744,219 B2 [18].

However, breaking a long electrode to pieces requires especial attention. From a system designer viewpoint, an optical waveguide or an RF traveling wave electrode are generally delay elements. Velocity matching from system design perspective then basically means the delays of these two elements are more or less aligned so that the interaction of RF signal and optical signal can be coherently added up all along the structure.

When the structure is broken to smaller segments, where these segments have inherently larger bandwidth given by the above equation, the original delay between the segments should be preserved, otherwise the coherent add-up of RF-optics interaction will be disrupted and the desired effect will not be achieved. On the other hand, adjusting delays independently is not a trivial thing, especially as the value of the delay become very small. For example, if this delay is to be implemented by the delay of the smallest inverter in today's advanced CMOS technologies, it can be in the order of 3 to 7 picoseconds (ps). This corresponds to the time needed for an optical signal to travel through a $LiNbO_3$ waveguide with a length of roughly 0.5 to 1 mm, or in the case of silicon waveguides, it corresponds to a length of approximately 0.2 to 0.5 mm. As a result, breaking the original large electrode to very small pieces requires working at the boundaries of the capabilities of available technologies and puts severe burden on the shoulders of engineers who have to design these delays and make sure that they perform properly.

Therefore, as it has been known in the cited art, when the electrodes are broken to segments, delays have to be introduced between them, and as long as the length of these pieces are short enough to deliver desired bandwidth, there is no reason to further shorten the electrodes, as it can increase the complexity of the timing circuitry.

However, the current invention addresses the problem of designing optical modulators holistically, and not just from the lens of bandwidth and speed. We will present a solution that addresses both problems of bandwidth (speed) as well as energy efficiency, and we will show how this can be applied to a wide range of optical modulators, regardless of whether they are phase, amplitude, or polarization modulators; whether they are waveguide based or free space; whether the material platform is semiconductor like silicon and indium phosphide, or crystals like lithium niobate, or electro-optic polymers.

To do this, let us first examine the energy efficiency shortcomings of velocity matching approach in a comprehensive fashion.

Although velocity matching can increase the bandwidth even for long electrodes, the BW will eventually be limited by other mechanisms such as RF loss and dispersion. Loss is especially a major issue, since it directly translates to the reduction of energy efficiency.

Engineered extension of the BW for long RF electrodes requires resistive termination. This is inevitable, since traveling wave electrode is inherently a transmission line which needs to be properly terminated. The resistive termination, by nature, is a major source of power consumption. As an example, a typical LiNbO3 modulator with 50Ω traveling wave electrodes and a drive voltage of 3 V, will have about 500 mW power consumption, only due to the 50Ω resistive termination. The power consumption due to the loss of electrodes itself will be extra to this 0.5 W waste of power.

Large power consumption in the resistive load means that normal resistors cannot be used. Instead, often high power especial resistors need to be deployed which automatically leads to the increase of form factor and cost.

Although by using high index contrast platform for optical waveguides, sharp bends in the optical domain can be readily achieved, implementation of sharp bends for traveling wave electrodes in RF domain is very complex and often leads to severe RF loss, and consequently significant reduction of energy efficiency. On the other hand, the usage of sharp bends is generally essential to reduce the form factor and cost.

In one example, a 2 mm long highly doped Si modulator with typical total junction capacitance value of around 1.5 pF can generally provide enough phase shift for most short distance applications, such as the ones needed in today's data centers. As we saw before, electronic control of delays for electrodes shorter than 0.2 mm is extremely difficult if not impossible for this device. Therefore, according to prior art, at best, one can divide the 2 mm to 10 segments and introduce proper delay between them to obtain the desired speed. Shorter delays are possible by utilizing passive elements such as transmission lines, but as explained before, each transmission line requires its own termination, that will add to the total wasted energy.

However, something that is missing from this is the energy efficiency of the light modulation.

Prior art, such as U.S. Pat. No. 7,039,258 [2] only deals with enhancing the operating speed of the modulator and making the amplitude of the modulating electrical signal along the modulator uniform. However, one of the most pressing issues of today's communication systems, i.e., optimization of the energy efficiency is completely absent from the prior art.

The current invention systematically looks at the issues of "speed" and "power", and offers a novel and inventive approach to optimize the energy efficiency of optical modulators. To do this, we define the power-delay product of the entire apparatus, as the energy efficiency figure of merit (EEFOM). This figure of merit takes into account both speed and power consumption and as such has units of energy, joules (J), and is a good indicator of the energy efficiency of the device. It is worth mentioning that a smaller value means a more energy efficient device.

Referring to the previous example, the capacitance of the 0.2 mm long segment of the silicon modulator is 150 fF. At a bit rate of 28 Gbps (giga-bits per second), this is still considered a substantial capacitive load. To drive such load, specially engineered drivers are needed which are both bulky (i.e., they take large chip area, therefore they are costly) and more importantly consume significant amount of energy. The core idea of the present invention attacks this fundamental issue.

The energy consumed to perform a binary operation between two voltage levels with a difference of $V_{dd}$ on a capacitor with capacitance C is given by $$\text{Energy} = 0.5 C V_{dd}^2.$$

This means the energy consumption is a linear function of capacitance, while a quadratic function of voltage difference.

However, one should be careful with this relation. The total energy consumed to perform a binary operation on a capacitive load (e.g., the junction capacitance of a Si modulator) is not limited to the one consumed by the load capacitor. The total energy is indeed the sum of energies consumed by the capacitor plus the one consumed by the driving circuitry. It is the driving circuitry that can indeed waste significant amount of energy. More interestingly, the energy consumption of this driver is not necessarily a linear function of load.

The total power consumption has 3 major components: "dynamic power dissipation", "short circuit power dissipation", and "leakage current power dissipation".

Dynamic power is due to the capacitive load as explained above. Short circuit power dissipation is due to the large current spikes that happens during transitions between different voltage levels, for example, going from logic level 1 to 0 or going from logic level 0 to 1. Finally, the leakage current power dissipation is due to the current that flows through active elements even when they are in off state.

The other factor that affects the total energy consumption is the time that takes to perform certain operation.

Larger loads require larger drivers. Larger drivers have often significantly lower speed and besides their parasitic capacitance grow with their size in a nonlinear fashion.

This nonlinearity in the value of parasitic together with larger delays (slower speed) of larger drivers, in conjunction with short circuit power dissipation as well as leakage current power dissipation, altogether dictate that the aggregate energy consumption of a circuit with capacitive load grows nonlinearly with the value of the load capacitance. The core idea of the current invention then stems from this observation. If a large capacitive load is broken into many small capacitors (figures below), and use smaller drivers on these smaller loads (keeping the sum of capacitances equal to the original value), the latter will have significantly better energy efficiency (smaller power-delay product) compared to the original circuitry.

Figure 2:
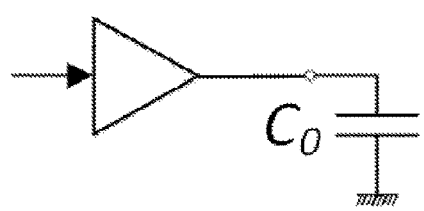
FIG. 2 is a schematic representation of a prior art capacitive load.

FIG. 2 is a schematic representation of a capacitive load. A large capacitance $C_0$ requires a large driver, which may be energy inefficient.

Figure 3:
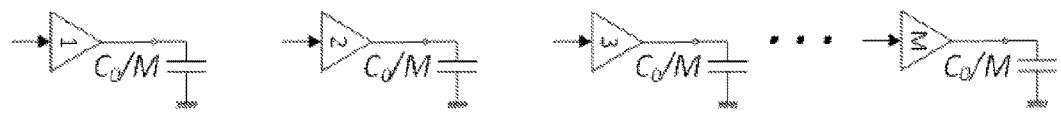
FIG. 3 is a schematic representation of an alternative capacitor load.

FIG. 3 is a schematic representation of an alternative capacitor load. In this figure the capacitance $C_0$ is divided to M individual capacitive load; each having capacitance of $C_0/M$. The total load capacitance, which is the sum of all, is constant and is still equal to $C_0$. Thus the aggregate energy efficiency is significantly improved.

It should be noted that the drivers can be built in various forms, topologies, and technologies. For example, they can be single ended or differential. They can be current mode logic (CML), static logic, or other logic configurations. They can be made in CMOS, bipolar, BiCMOS, GaAs, InP, GaN, or other technologies.

To further illustrate the merit of the current invention, a representative example will be discussed below.

Consider a CMOS tapered buffer with a starting load capacitance of $C_{in}$, which is supposed to drive a section of an optical modulator with a total capacitance $C_{sec}$, and each driver stage of the tapered buffer is 3 times larger than the previous one. The load to source ratio is $Y = C_{sec}/C_{in}$, and the EEFOM (defined above) will be [32], $$EEFOM_1 \propto \frac{\beta^2}{(\beta-1)\ln\beta}(Y-1)$$

Now, if each section is divided to M sub-sections with capacitance $C_{sub}=C_{sec}/M$, the EEFOM for the new structure, which is the sum of the power-delay products of all M sub-sections will be:

$$EEFOM_2 \propto M \frac{\beta^2}{(\beta-1)\ln\beta}(Y/M - 1) = \frac{\beta^2}{(\beta-1)\ln\beta}(Y - M).$$

It is clearly seen that EEFOM2 is smaller than EEFOM1, which means that the structure based on the current invention is more energy efficient.

As a numerical example, for the previous case of Si modulator with 150 fF capacitance for 0.2 mm length, $C_{sec}$=150 fF. If we divide it to 8 sub-sections of 25 µm length, each subsection has a capacitance of $C_{sub}$=19 fF. Now, for a starting load capacitance of 15 fF, we have Y=150/15=10, we get EEFOM1/EEFOM2=(10−1)/(10−8) =4.5. This means the structure proposed here can be 4.5× more energy efficient than prior art. This illustrates the tremendous amount of energy saving that can be gained through this invention.

Of course, it is understood by those skilled in the art, that the simple above analytical equation only applies to CMOS tapered buffer and even then, the above equations highly simplify the complex problem of energy consumption, and the energy savings in reality may be different. Nonetheless, it is an illustrative example to demonstrate the significant merit of the current invention.

The solution that simultaneously optimizes bandwidth as well as energy efficiency according to the current invention is then generally as follows:

Break the length of the modulator to sections that are just short enough to create the required bandwidth for the given velocity mismatch.

Introduce necessary delay between electrical signals feeding each section, to artificially re-synchronize optical and RF fields. This, in essence, forces the structure to emulate the timing conditions of a traveling wave optical modulator.

Break each section to as many smaller sub-sections as possible, and drive the subsections within each section with electrical signals whose relative time delays are substantially minimised, yet coming from individual drivers to reduce the electrical loading of each driver.

If the optical modulator sections and the electrical drivers are formed on separate chips, the limits of how small these sub-sections are, can be determined by the packaging limitation in the pitch size of connectors between the electrical drivers and optical modulator elements, as well as the magnitude of parasitic components of these connections. However, if the optical modulator sections and the electrical drivers are formed on the same chip, the limits of how small these sub-sections are, can be mainly determined by parasitic components of these connections, and instead pitch size of the connections is likely to be of secondary concern.

This invention provides the desired speed for an optical modulator, while concurrently reducing the energy consumption.

The current invention can be generally applied to any platform, including but not limited to any combination of any of elemental semiconductors, alloy semiconductors, crystalline semiconductors, poly-crystalline semiconductors, amorphous semiconductors, binary semiconductors, ternary semiconductors, quaternary semiconductors, ferroelectric crystals, organic or inorganic materials with Pockels effect, silicon (Si), germanium (Ge), silicon germanium (SiGe), indium phosphide (InP), gallium arsenide (GaAs), lithium niobate (LiNbO$_3$), Barium Titanate (BaTiO$_3$), Potassium Titanyl Phosphate (KTP), electro-optic polymers, thermo-optic polymers, or graphene. Furthermore, various mechanisms may be used for modulating the properties of the optical signal, including but not limited to, carrier depletion, carrier injection, metal-oxide semiconductor (MOS) capacitance, plasma dispersion effect, Franz-Keldysh effect, Pockels effect, quantum confined Stark effect, or electro-optic Kerr effect.

Figure 4:
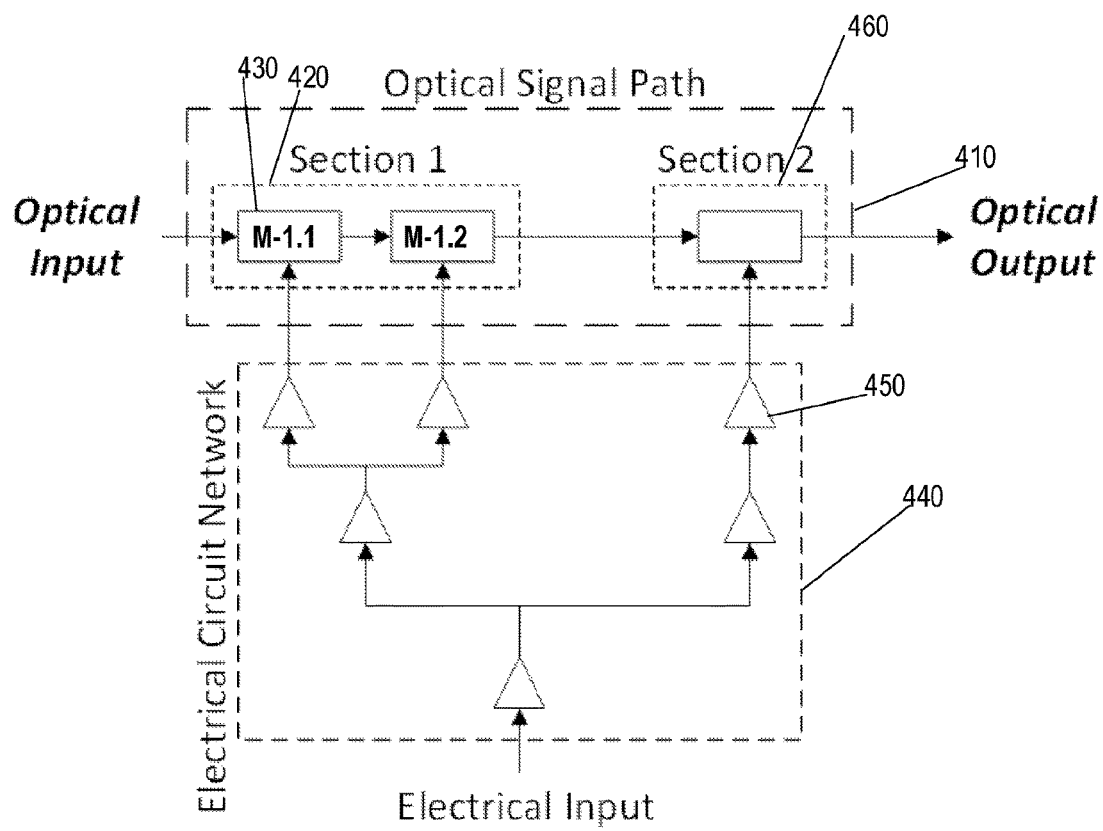
FIG. 4 illustrates a schematic representation of an apparatus according to the current invention.

Referring to FIG. 4, this figure illustrates a schematic representation of an apparatus according to the current invention. An input optical signal goes into an optical signal path 410 from which an output optical signal comes out. The optical signal path 410 is divided into two sections 420, 460. The first section 420 is divided into two sub-sections 430, whereas the second section 460 includes one sub-section. An electrical signal network or circuit 440 is provided, which includes electrical drivers 450. Each subsection 430 is coupled with a separate electrical driver 450. It will be noted that the delays between electrical signals driving the modulating element of two adjacent sub-sections 430 within one section 420 is substantially minimised, whereas there is a delay between electrical signals driving the modulating elements of subsections within two sections 420 and 460, which may be or may not be substantially minimised. In other words, there may be substantially no delay between two subsections within a section, but there may be a delay between two subsections.

In FIG. 4, each subsection 430 of a section 420 includes an optical modulating element. In one example, the optical signal path 410 is divided into sections 420, 460. Here, there is no specific delay element in electrical circuit 440. However, the electrical drivers are designed and configured such that there is a delay between the signal driving sub-sections within section 460 compared to the signals driving subsections 430 of section 420. The section 420 is divided into two subsections 430, and the delay between these two subsections 430 is substantially minimised.

Figure 5:
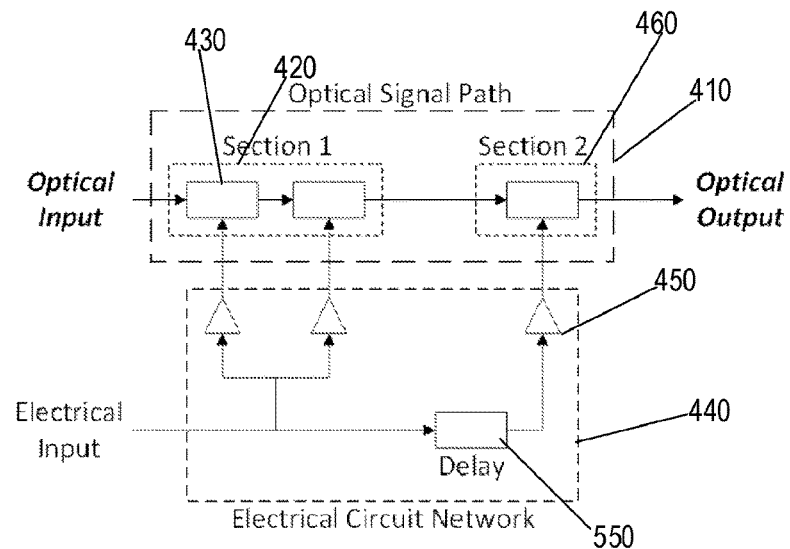
FIG. 5 is a schematic representation of an alternative apparatus.

FIG. 5 is a schematic representation of an alternative exemplary embodiment. Many features of FIG. 5 are the same as those of FIG. 4 and thus carry the same reference numbers, except an electrical delay element 550 is introduced between electrical drivers driving two sections 420, 460.

Figure 6:
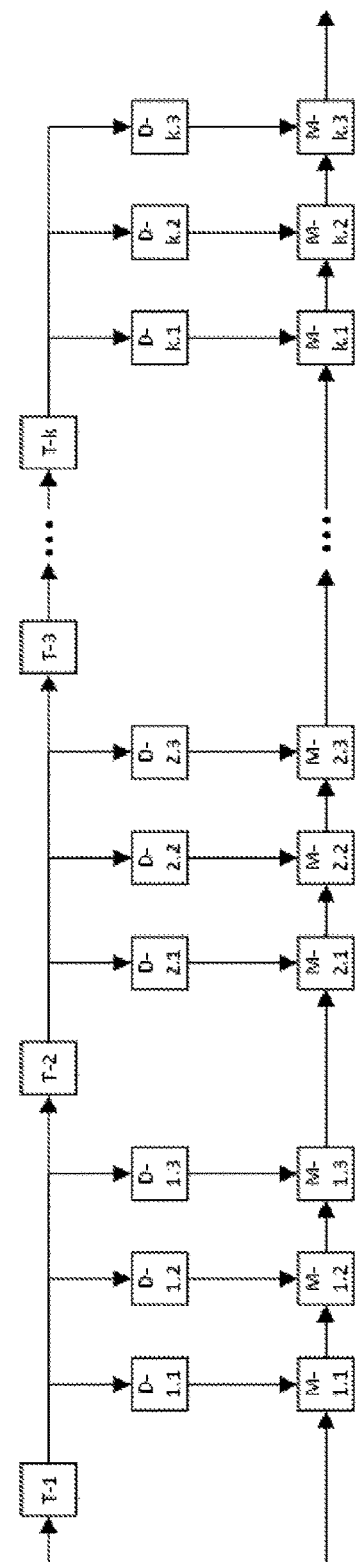
FIG. 6 is a schematic representation of an alternative apparatus.

FIG. 6 is a schematic representation of an alternative electro-optic device. Unlike FIG. 1, here more modulator elements (M) are used while the number of delay elements (T−k) is kept constant. The delay elements (T−k) are placed between two sections, whereas no separate delay elements are present between sub-sections. By dividing each section to sub-sections and using smaller modulator elements (M−k·j) for sub-sections, smaller electrical drivers (D−k·j) can be used which significantly improves the energy efficiency and significantly reduces the engineering design complexity. The delay elements may comprise electronic delay elements or passive delay elements such as transmission lines, or a combination thereof. In this embodiment, there is one group including the sections and subsections.

Figure 7:
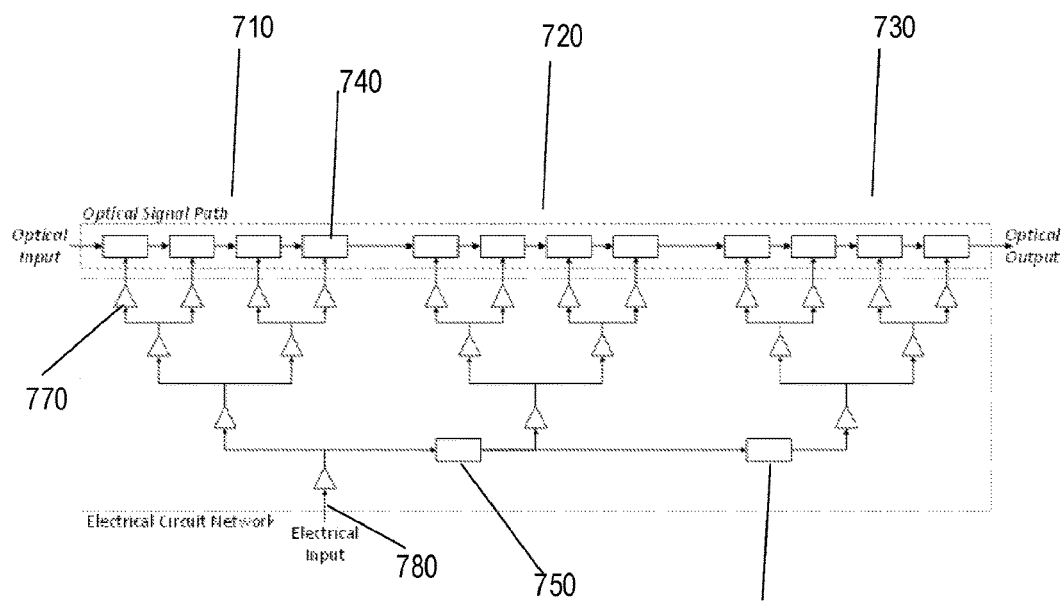
FIG. 7 is a schematic representation of an alternative apparatus.

FIG. 7 is a schematic representation of an alternative electro-optic device. In this embodiment, the optical signal path is divided to three sections 710, 720, 730. Fixed delay elements 750, 760 are placed between the sections 710, 720, 730. Each section is divided to four sub-sections 740, which experience substantially similar delays, yet are driven by separate drivers 770. There is only one electrical input signal 780 and the electrical circuit has for example a hybrid bus and tree network topologies. There is only one group shown in this example.

Figure 8:
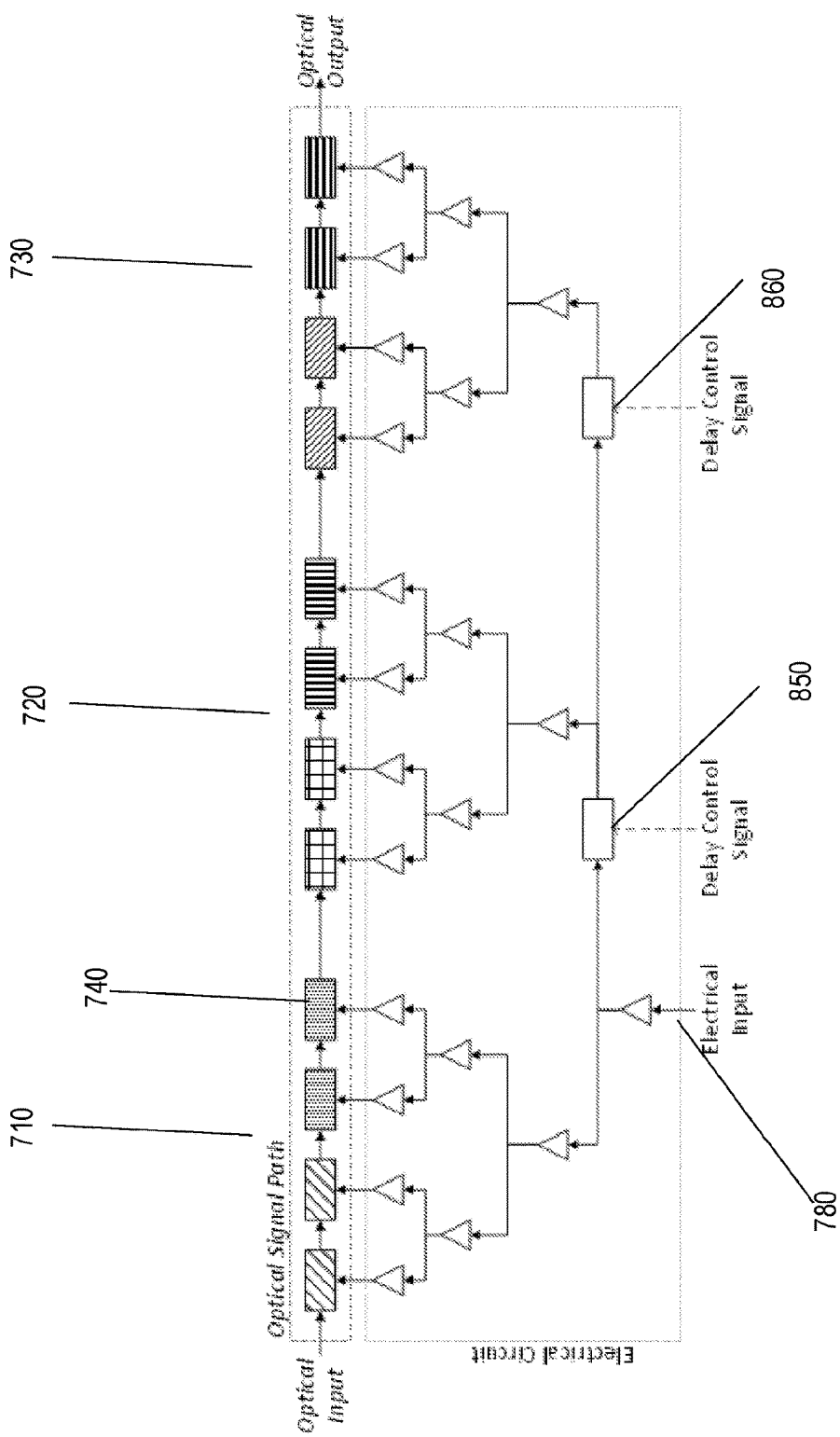
FIG. 8 is a schematic representation of an alternative apparatus.

FIG. 8 is a schematic representation of an alternative exemplary apparatus according to the current invention. Many features of FIG. 8 are the same as those in FIG. 7 and thus carry the same reference numbers, except that the delay elements 850, 860 are controllable and as such besides the electrical input signal 780, there exist two delay control signals.

Figure 9:
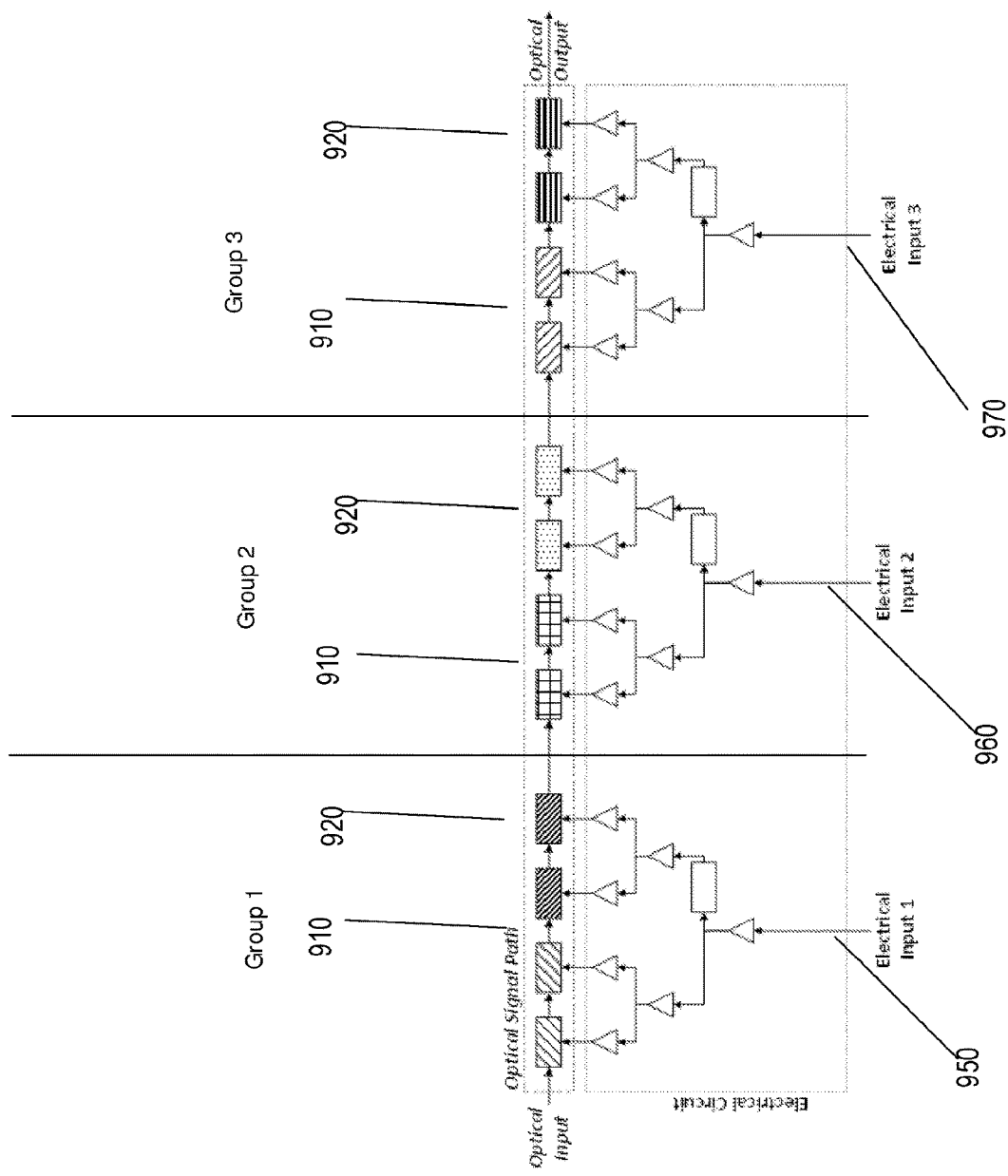
FIG. 9 is a schematic representation of an alternative apparatus.

FIG. 9 is a schematic representation of an alternative exemplary apparatus according to the current invention. In this embodiment, the optical signal path is divided into three groups; each group is divided into two sections 910, 920 with fixed delay between their respective electrical drivers. Each section is then divided to 2 sub-sections, which experience substantially minimised delays, yet are driven by separate drivers. There is one separate electrical input signal 950, 960, 970 for each group, and as such there exist three such signals. If modulator elements are phase modulators, this example structure may be used for 4-level phase modulation. On the other hand, if modulator elements are amplitude modulators (such as absorption modulators), this example structure may be used for 4-level pulse amplitude modulation. It is well understood by people experienced in the art, that by using similar structure, other multi-level modulation formats such as M-ary phase shift keying (PSK), M-ary amplitude shift keying (ASK), M-ary quadrature amplitude modulation (QAM), multi-level pulse amplitude modulation (PAM), etc., can also be obtained.

As an example, if the PAM-4 is originally represented by 2 binary bits $<b_2b_1>$, first those two bits should be decoded to generate electrical signals 950, 960, and 970. The decoding may be performed according to the following rule: for <00> the three electrical signals 950, 960, and 970 are all set at logic level zero; for <01> the electrical signal 950 is set at logic level one, but two electrical signals 960 and 970 are set at logic level zero; for <10> the electrical signal 950 is set at logic level zero, but two electrical signals 960 and 970 are set at logic level one; and finally for <11> the three electrical signals 950, 960, and 970 are all set at logic level one.

Following this decoding rule, if the modulating elements are phase modulators, a 4-level phase modulated optical signal will be generated by the structure of FIG. 9. This 4-level phase modulated optical signal may be used in an interferometer structure, such as Mach-Zehnder interferometer structure, to obtain a 4-level pulse amplitude modulation (PAM-4) optical signal.

In yet another example, following the aforementioned decoding rule, if the modulating elements are amplitude modulators (e.g., based on Franz-Keldysh effect or free carrier absorption effect), a 4-level pulse amplitude modulation (PAM-4) optical signal can be directly generated from FIG. 9 and there will no need for an interferometer.

It is well understood by those experienced in the art, that by extending the structure, higher order modulation signals such as PAM-8, PAM-16, etc., can also be obtained in a similar fashion.

Figure 10:
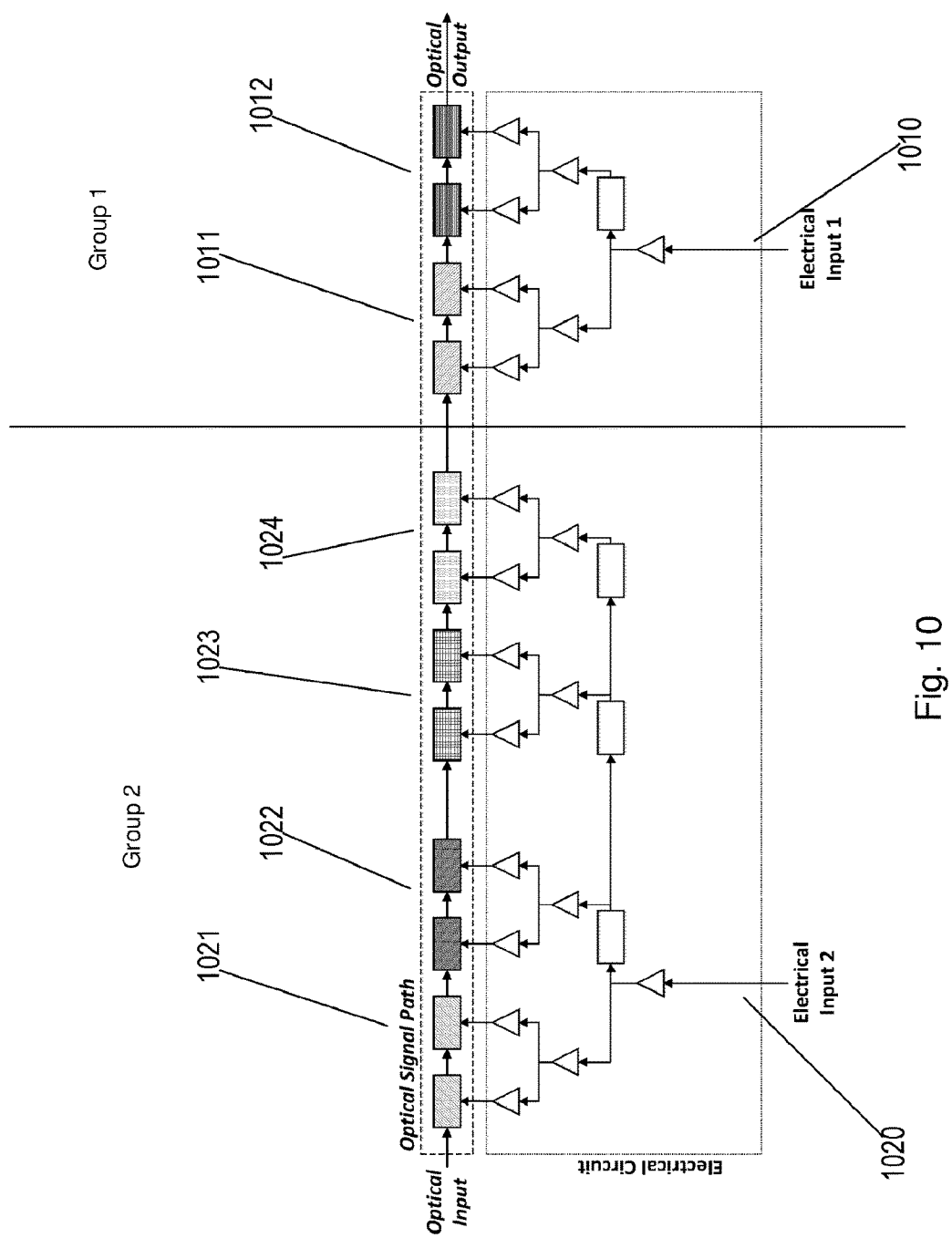
FIG. 10 is a schematic representation of an alternative apparatus.

FIG. 10 is a schematic representation of an alternative exemplary apparatus according to the current invention. This figure is related to FIG. 9. In one example, if modulator elements are phase modulators, this structure may be used for 4-level phase modulation. If it is further inserted into an interferometer, such as Mach-Zehnder interferometer structure, it can be used for 4-level amplitude modulation, such as PAM-4. In this configuration, however, decoding of the signal, as explained in FIG. 9, is not needed. This structure has only two groups, but the modulating strength of the group 2 is twice the group 1, since it has twice the number of optical modulating elements. The group 2 is divided into four sections 1021, 1021, 1023, 1024; each section having two sub-sections. Whereas group 1 is divided into two sections 1011, 1012; each section having 2 sub-sections. For the purpose of clarity, subsections of each section are filled with the same pattern on the figure.

In contrast to the example of PAM-4 explained in FIG. 9, the original 2 binary bits $<b_2b_1>$ determine the setting of input electrical signals according to the following rule: The Electrical Input Signal 2, 1020, corresponding to group 2, is set according to the most significant bit $<b_2>$, while the Electrical Input Signal 1, 1010, corresponding to group 1, is set according to the least significant bit $<b_1>$. As it is evident, the advantage of the configuration of FIG. 10 over the configuration of FIG. 9 is that the original bits representing the PAM-4 signal can be directly used and no decoding is needed.

Following this rule, a 4-level phase modulated optical signal can be generated by exploiting phase modulators for optical modulating elements. If needed, the generated 4-level phase modulated optical signal can be converted to a 4-level amplitude modulated signal, PAM-4, by using an optical interferometric structure, as explained in FIG. 9.

However, if the modulating elements are amplitude modulators (e.g., based on Franz-Keldysh effect or free carrier absorption effect), a 4-level pulse amplitude modulation (PAM-4) optical signal can be directly generated from FIG. 10 and there will be no need for an interferometer.

It is well understood by those skilled in the art, that by applying the same concept and exploiting a similar or an extended structure, higher order pulse amplitude modulation formats such as PAM-8, PAM-16, etc., or other modulation formats such as M-ary PSK, M-ary ASK, M-ary QAM, or multi-level phase modulation can also be obtained in the same fashion.

Figure 11:
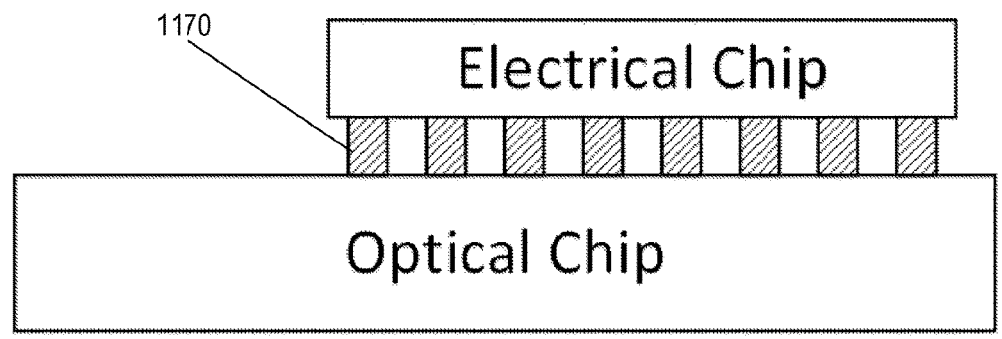
FIG. 11 is a schematic illustration of how the drivers are connected to optical modulator elements using copper pillars.

FIG. 11 is a simplified schematic illustration of how the drivers are connected to optical modulator elements using copper pillars. Drivers are on the Electrical Chip, whereas optical modulator elements are on the Optical Chip. Copper pillars (hatched sections) 1170 are connecting the two chips. With today's technology very low parasitics as small as 10 fF are possible. Also, currently the separation of adjacent pillars 1170 (pitch size) can be as close as 25 μm. With further improvement of the technology, the pitch size can become smaller than 25 μm and the parasitics may become even smaller than 5 fF. Besides copper pillar shown here, variety of other techniques, such as flip-chip bonding, through-silicon via (TSV), or fan-out wafer level packaging (FOWLP), can also be used to connect the two chips together [30].

Figure 12:
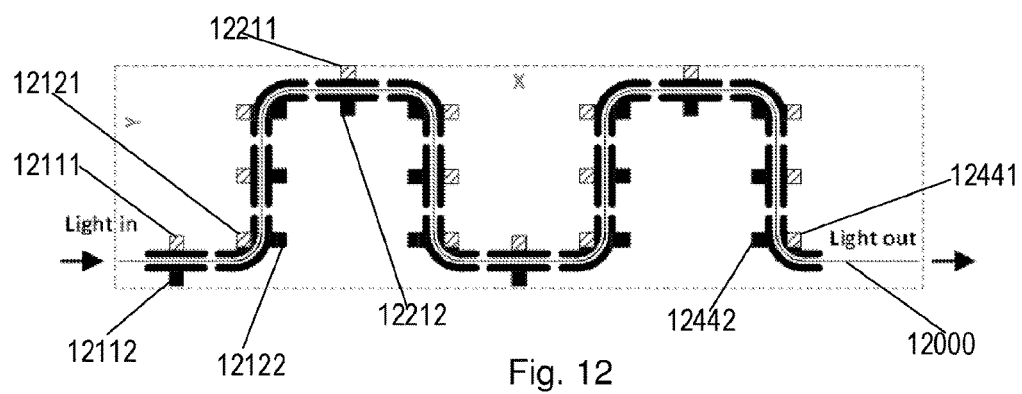
FIG. 12 is a schematic representation of an alternative apparatus.

FIG. 12 is a schematic representation of an alternative apparatus according to the current invention. In this exemplary embodiment, the optical signal path(s) is (are) configured as meandered structure(s) which can improve the aspect ratio (ratio of Y over X in the figure) of the real estate footprint (X times Y) of the structure, and as such may enhance fabrication yield and reduce the total cost. The structure may reduce the total footprint of the structure which can further reduce the cost. The exemplary structure of FIG. 12 is divided to four sections, and each section into four sub-sections. Following the notation of FIG. 6, 12111 and 12112 are the ports associated with the optical modulating element (M−1.1) of sub-section 1 within section 1;

12121 and 12122 are the ports associated with the optical modulating element (M-1.2) of sub-section 2 within section 1; 12211 and 12212 are the ports associated with the optical modulating element (M-2.1) of sub-section 1 within section 2; and 12441 and 12442 are the ports associated with the optical modulating element (M-4.4) of sub-section 4 within section 4. For brevity, the remaining ports are not numbered. The path through which the optical signal propagates is 12000. It is understood by those skilled in the art that 12000 may comprise more than one optical signal path. The corresponding electrical driver chip is shown in the next figure (FIG. 13).

Figure 13:
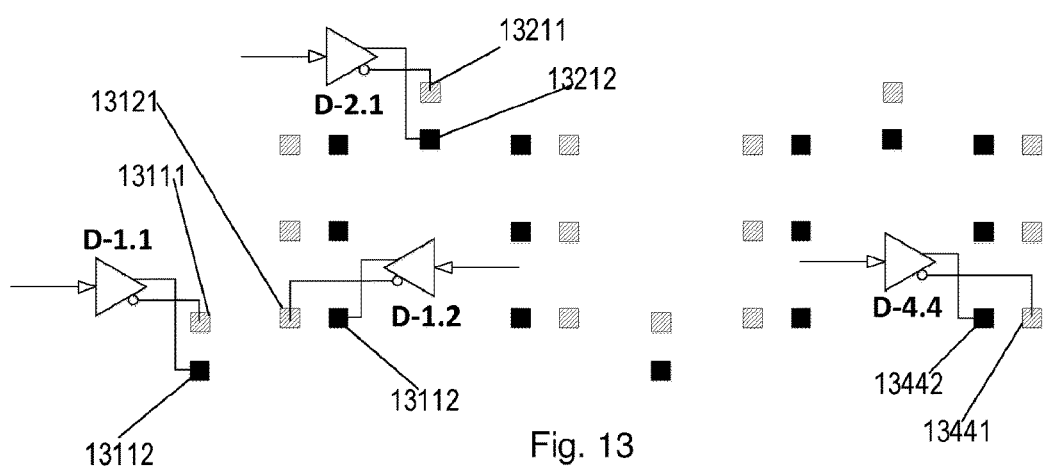
FIG. 13 illustrates a pad layout for the electronic chip corresponding to FIG. 12.

FIG. 13 illustrates a pad layout for the electronic chip corresponding to FIG. 12. This figure depicts the schematic representation of one exemplary configuration of the electrical drivers. The normal outputs of the drivers are connected to black colored pads, while the complementary outputs are connected to hatched pads. For brevity only 4 drivers are schematically shown. Following the notation of FIG. 6, the electrical driver D-k·j (in this figure k=1, 2, 3, 4 and j=1, 2, 3, 4) corresponds to subsection j within section k and are associated with pads 13$kj$1 and 13$kj$2, accordingly. For example, the driver D-1.1, is connected to pads 13111 and 13112. These two pads may be further coupled to ports 12111 and 12112 for driving the optical modulating element M-1.1 of FIG. 12. The coupling between the structure of FIG. 13 and FIG. 12 may be formed using variety of techniques, for instance the copper pillar technique as schematically shown in FIG. 11.

It is understood that although the structures of FIGS. 13 and 12 have four sections and each section has four sub-sections, other arrangements of sections and sub-sections are possible according to the current invention.

Figure 14:
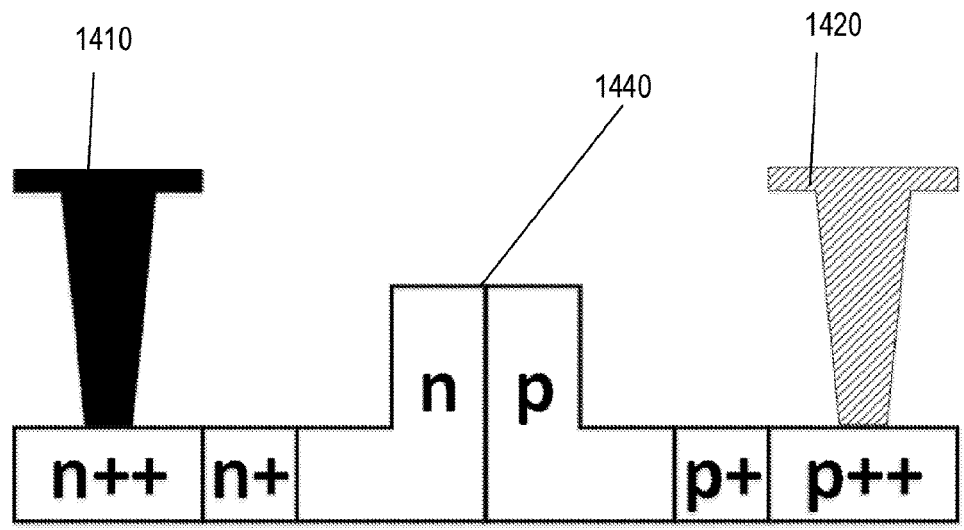
FIG. 14 illustrates an exemplary modulator element.

FIG. 14 illustrates an exemplary optical modulating element. It is a semiconductor p-n structure where the phase or amplitude of the optical signal may be controlled by applying an electrical signal to its ports 1410, 1420. The raised portion 1440, which comprises the p-type region and the n-type region, is a waveguide portion carrying the optical signal. The structure shown in the figure may be used as the optical modulating element in FIG. 12, wherein the waveguide portion 1440 may correspond to the optical path 12000.

Figure 15:
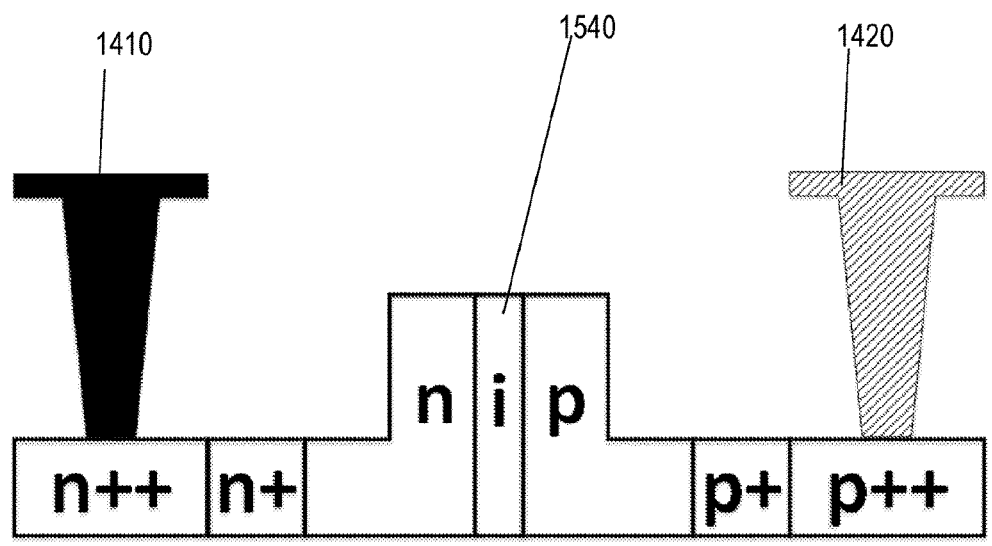
FIG. 15 illustrates an alternative exemplary optical modulating element.

FIG. 15 illustrates an alternative exemplary modulating element. It is a semiconductor p-i-n structure where the phase or amplitude of the optical signal may be controlled by applying an electrical signal to its ports 1410, 1420. The raised portion is a waveguide portion that comprises an intrinsic semiconductor 1540 sandwiched between the n and p regions. The structure may exhibit less optical propagation loss compared to FIG. 14, since the intrinsic semiconductor layer 1540 can have negligible free carrier absorption. The structure shown in the figure may be used as the optical modulating element in FIG. 12, wherein the waveguide portion of this figure may correspond to the optical path 12000.

Figure 16:
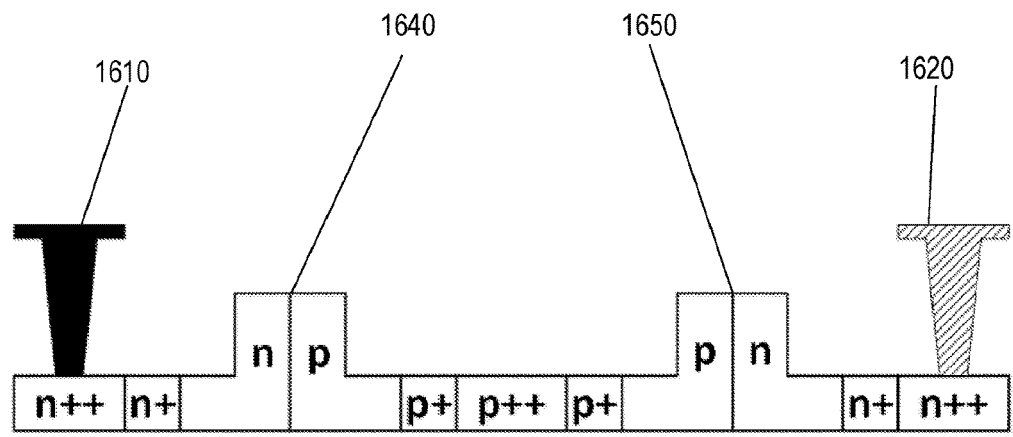
FIG. 16 illustrates an alternative exemplary optical modulating element.

FIG. 16 illustrates an alternative exemplary modulating element. It may be used in variety of structures such as a meandered structure similar to FIG. 12. The n-p-p-n semiconductor structure in this example comprises two optical waveguides (the two raised p-n sections) 1640, 1650 and has two electrical ports 1610, 1620. The operation of the structure can be understood by a person familiar with the art by referring to [33]. The structure shown in the figure may be used as the optical modulating element in FIG. 12. For example, in FIG. 12, sub-section 4 of section 4, the ports 12441 and 12442 may correspond to ports 1620 and 1610 in FIG. 16, respectively; and the optical signal path 12000 may correspond to two waveguide portions of this figure.

Figure 17:
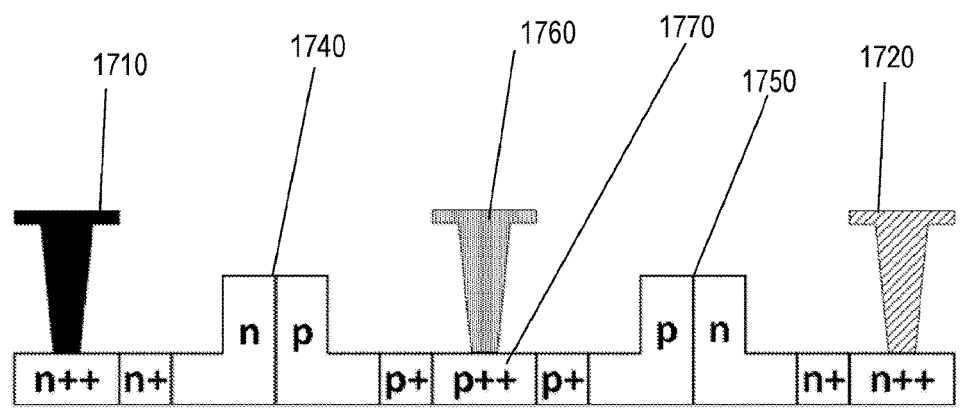
FIG. 17 illustrates an alternative exemplary optical modulating element.

FIG. 17 illustrates an alternative exemplary modulating element. This figure is very similar to FIG. 16, but the n-p-p-n structure comprises three electrical ports 1710, 1720 and 1760 instead of two ports of FIG. 16. The third electrical port 1760 which is placed in the middle p++ section 1770 which may be used in conjunction with an inductive element for at least one of DC bias of the semiconductor structure for prevention of charge build-up. The high frequency operation of the structure is however similar to FIG. 16 since at high frequency the inductive element is effectively open-circuit. The semiconductor structure in this example comprises two optical waveguide portions (the two raised p-n sections) 1740, 1760. Each of these two waveguides may correspond to a separate arm of a Mach-Zehnder interferometer based optical modulator.

The structure shown in the figure may be used as the optical modulating element in FIG. 12. For example, in FIG. 12, sub-section 4 of section 4, the ports 12441 and 12442 may correspond to ports 1720 and 1710 in FIG. 16, respectively; and the optical signal path 12000 may correspond to two waveguide portions of this figure. It is understood by those skilled in the art, that if FIG. 17 is used as the optical modulating element, an extra middle port needs to be incorporated into the structure of FIG. 12 to which the middle pad 1750 of FIG. 17 will correspond.

Figure 18:
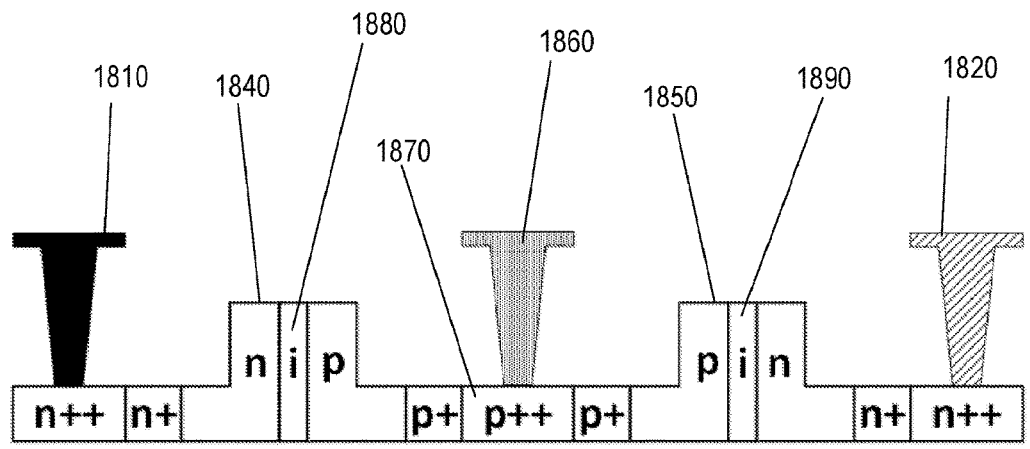
FIG. 18 illustrates an alternative exemplary optical modulating element.

FIG. 18 illustrates an alternative exemplary modulating element. This figure is similar to FIG. 17. Here, however, the semiconductor structure is n-i-p-p-i-n. The sandwiched intrinsic layers (i) 1880, 1890 may reduce the optical propagation loss, by virtue of decreasing free carrier absorption in semiconductors. Similar to FIG. 17, the structure shown in this figure may be used as the optical modulating element in FIG. 12.

Figure 19:
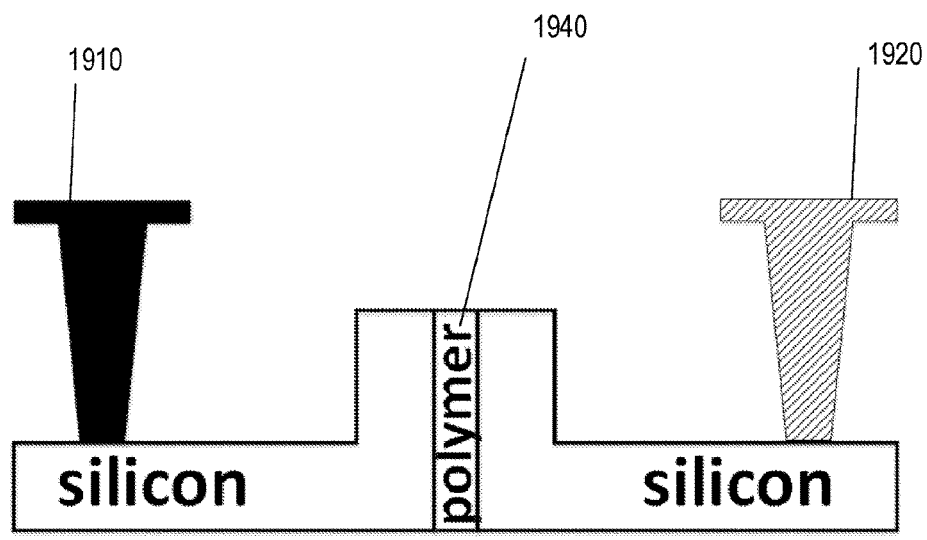
FIG. 19 illustrates an alternative exemplary optical modulating element.

FIG. 19 illustrates an alternative exemplary modulating element. Here, a trench 1940 is fabricated between two semiconductor sections (regions) and it is further filled with, for example, polymers with Pockels effect. The polymer generally acts as the dielectric of the capacitor which the electrical driver needs to drive. The methodology of the current invention again improves the energy efficiency of the apparatus. Two input electrical signal ports 1910, 1920 are also provided. It is understood that the semiconductor material can comprise silicon, germanium, silicon germanium or other semiconducting materials.

Figure 20:
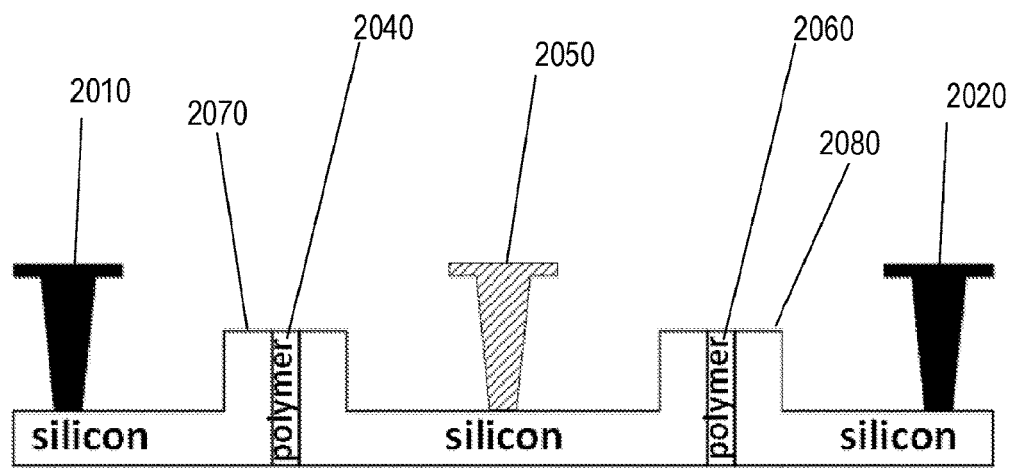
FIG. 20 illustrates an alternative exemplary optical modulating element.

FIG. 20 illustrates an alternative exemplary modulating element. Here, two trenches 2040, 2060 are fabricated between semiconductor (e.g. silicon) sections (or regions) and they are filled with, for example, polymers with Pockels effect. The polymer generally acts as the dielectric of the capacitor which the electrical driver needs to drive. The two waveguides 2070, 2080 can be the two arms of a Mach Zehnder interferometer. It will be noted that it is desirable that the pads 2010, 2020 at both sides are connected to the same output of the electrical driver, whereas the middle pad (the hatched one) 2050 is connected to the complementary output of the driver. The methodology of the current invention again improves the energy efficiency of the apparatus while operating at high speed.

Figure 21:
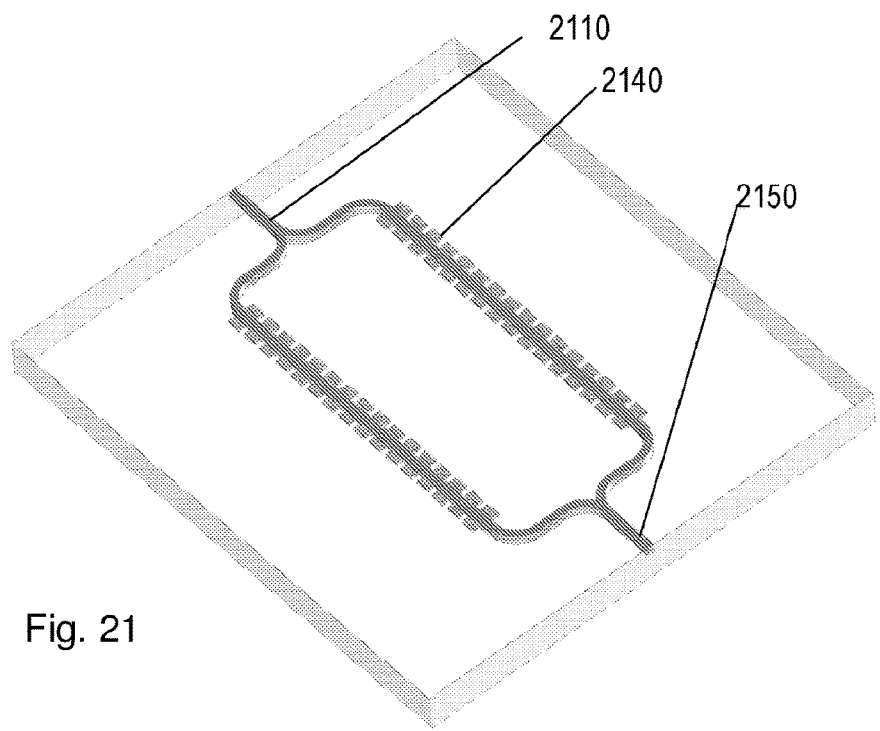
FIG. 21 is a three dimensional view of an exemplary Mach-Zehnder modulator.

FIG. 21 is a three dimensional view of an exemplary Mach-Zehnder modulator. The modulator includes an input waveguide 2110 and an output waveguide 2150. The input and output waveguides 2110, 2150 are coupled with a pair of arms 2140. Each arm is divided to 4 sections, each having 4 subsections. This can be implemented in silicon, germanium, silicon germanium, gallium arsenide, indium phosphide, lithium niobate, polymers, or other types of modulator materials. The electronic drivers, fabricated on a separate silicon chip, may be bonded on top of this structure using flip chip technique, copper pillar method, or other packaging techniques.

Figure 22:
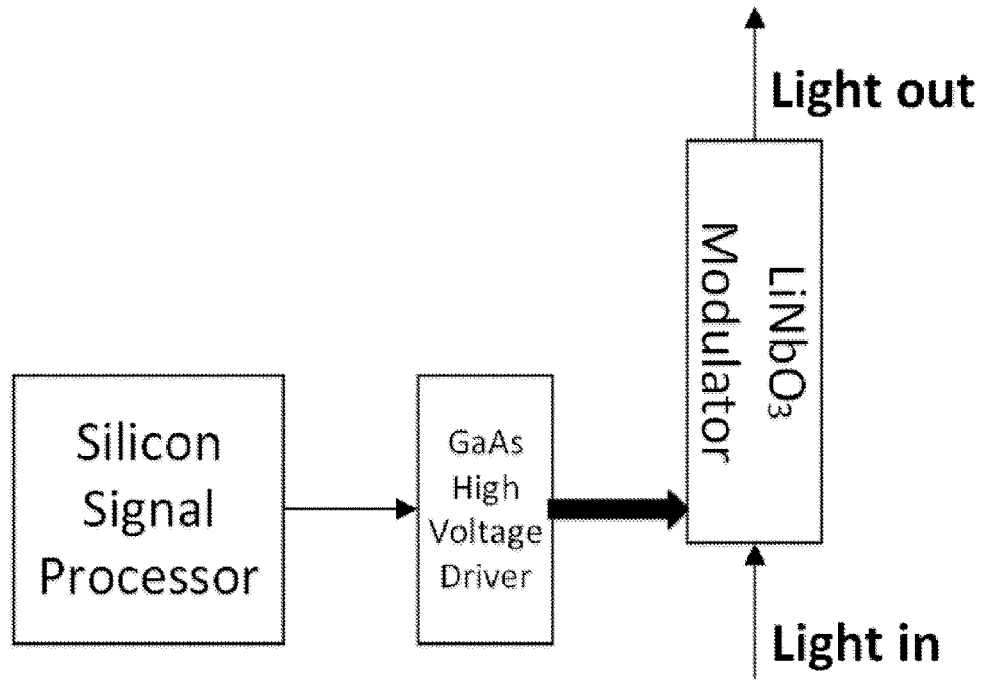
FIG. 22 depicts an exemplary embodiment of a high-fidelity optical modulation system according to prior art.

FIG. 22 depicts an exemplary embodiment of a high-fidelity optical modulation system according to prior art. The signal processing is performed in silicon based electronic chips. It is understood by people experienced in the art that the signal processor here is very general and may comprise any combination of central processing unit (CPU), graphical processing unit (GPU), digital signal processor (DSP), micro controller unit (MCU), application specific integrated circuit (ASIC), field programmable gate array (FPGA), arithmetic logic unit (ALU), analog to digital converter (ADC), digital to analog converter (DAC), transmitter (Tx), receiver (Rx), transceiver (Tx/Rx), amplifier, buffer, digital filter, analog filter, discrete time filter, or signal conditioning circuitry. The signal of interest is transferred to high voltage amplifier made in Ill-V semiconductors such as GaAs or GaN. The high frequency high-voltage signal is then used to drive the $LiNbO_3$ modulator. The use of Ill-V based amplifiers is unavoidable due to necessity of high voltage levels needed to drive $LiNbO_3$ modulator.

Figure 23:
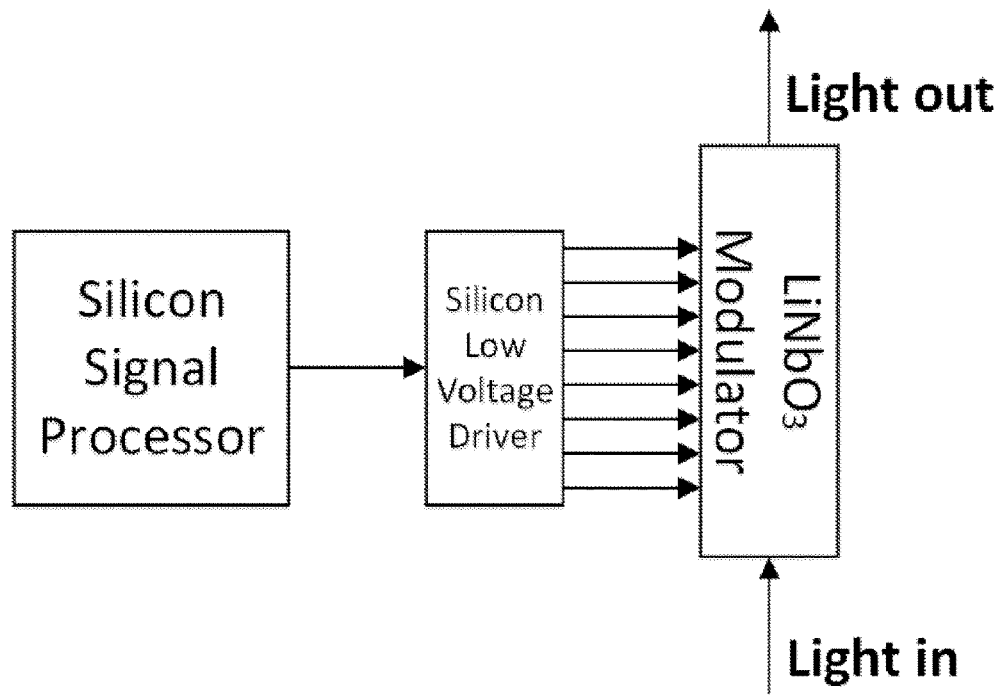
FIG. 23 depicts an exemplary embodiment of a high-fidelity optical modulation system according to the present invention.

FIG. 23 depicts an exemplary embodiment of a high-fidelity optical modulation system according to the current invention. The division of the signal path to sections and sub-sections enable the usage of low voltage signal instead of high voltage ones. Since high-frequency low-voltage electronics can be made in today's silicon technologies, the need for very expensive III-V drivers is eliminated. This dramatically simplifies the system and reduces the total cost as well as form factor.

Figure 24:
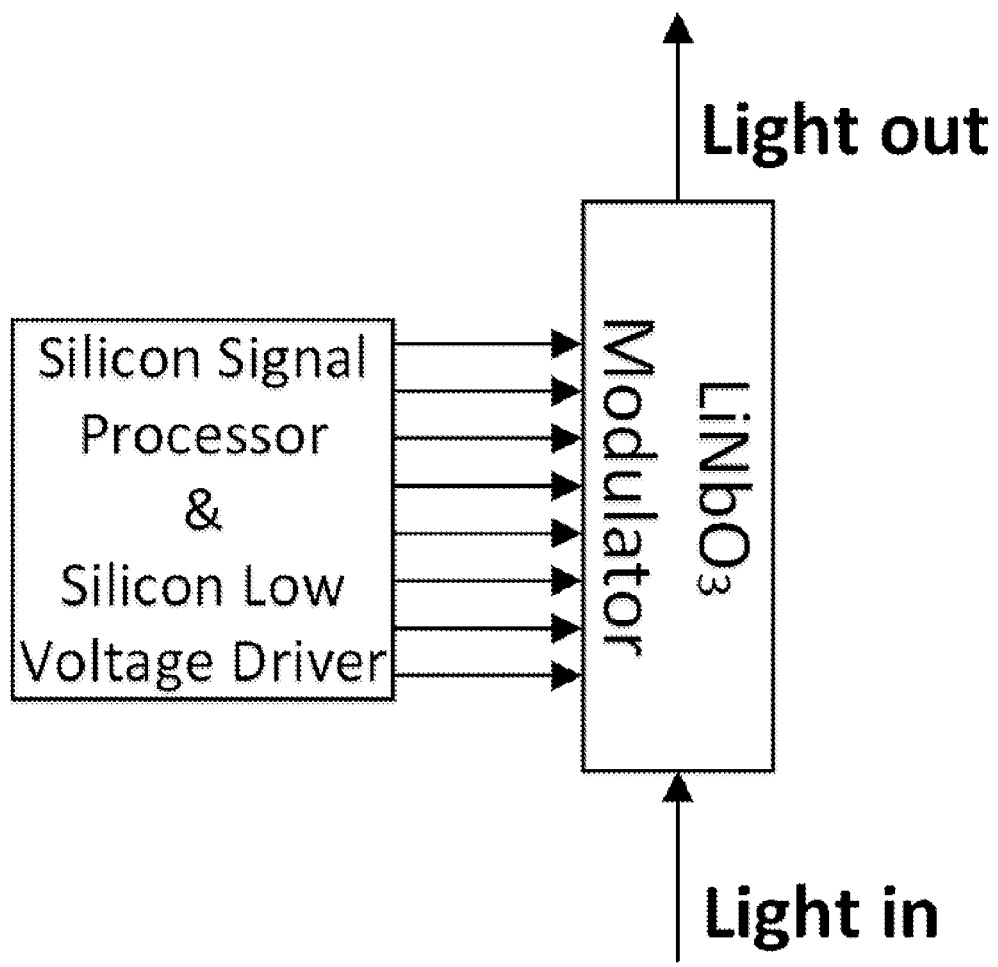
FIG. 24 depicts yet another exemplary embodiment of a high-fidelity optical modulation system according to the present invention.

FIG. 24 depicts yet another exemplary embodiment of a high-fidelity optical modulation system according to the current invention. It is similar to FIG. 23, but since signal processor and drivers are both silicon based, they may both co-packaged together or even co-fabricated in a monolithic fashion.

Figure 25:
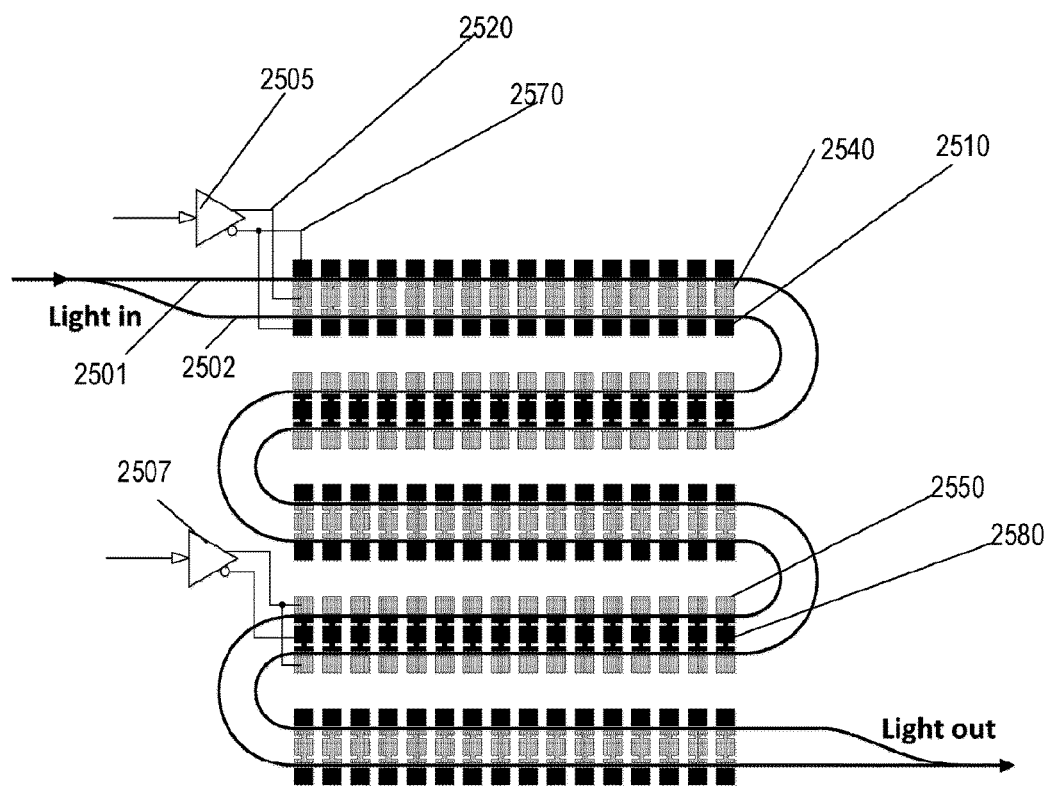
FIG. 25 depicts another exemplary embodiment of a high-fidelity optical modulator in materials with Pockels effect according to the current invention.
Figure 25:
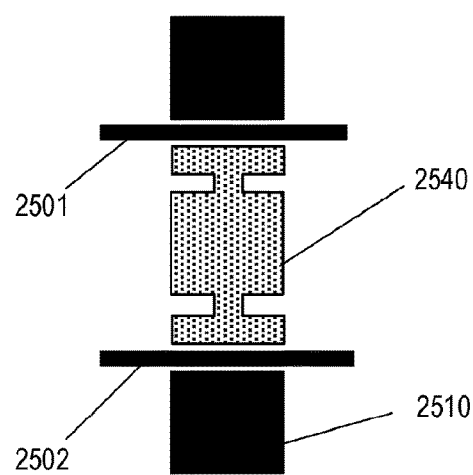

FIG. 25 depicts another exemplary embodiment of a high-fidelity optical modulator in materials with Pockels effect according to the present invention. The material can be for example ferroelectric crystals such as $LiNbO_3$ or Potassium Titanyl Phosphate (KTP), or semiconductors with Pockels effect such as gallium arsenide, or alternatively polymers with electro-optic effect. The modulator includes meandered signal paths which help dramatically symmetrize the aspect ratio of the device footprint. One exemplary application of FIG. 25 is to be used as the optical modulator in the high-fidelity optical modulation systems of FIG. 23 and FIG. 24. It is understood by those skilled in the art that, for the sake of brevity, only two electrical drivers are schematically shown in the figure.

In FIG. 25 (a), each signal path comprises two types of portions: a first portion and a meandered portion. The optical elements of the first portions have dotted colored pads 2540 in the middle and black colored pads 2510 at sides. However, the optical modulating elements of the meandered portions have dotted colored pads 2550 at sides and black colored pads 2580 in the middle. Both in the first portion and in the meandered portion, the standard outputs of electrical drivers are coupled to dotted colored pads, whereas the complementary outputs of the electrical drivers are connected to black colored pads. The standard outputs 2520 of the drivers 2505 are connected to the dotted colored pads 2540, whereas the complementary outputs 2570 of the drivers 2505 are connected to the black colored pads 2510. The relative locations of dotted and black colored pads are switched every time an optical signal path experiences a 180-degree bend. This change of polarity of terminals is generally desirable (essential) to obtain correct direction of electric field inside the crystal, in order to obtain the desired phase change due to Pockels effect. For example, in the meandered portion, the dotted colored pads 2550 are placed in at sides while still coupled to the standard outputs of the electrical drivers 2507 and the black colored pads 2580 are placed in the middle while still coupled to the complementary outputs of the drivers 2507. In this exemplary embodiment, an electrical driver with two outputs, a standard one and a complementary one, are used. However, it is understood by those skilled in the art that different configurations of electrical drivers can also be used with this optical structure. For instance, the two-output driver in the figure can be replaced by two separate drivers. Other example will be using only one single-output driver and coupling it to pads associated with one of the optical signal paths, and coupling the ports associated with the other optical signal path to the electrical ground.

FIG. 25 (b) is the zoomed out view of a sub-section of a first portion of FIG. 25 (a). The sub-section comprises two signal paths 2501 and 2502. In this view, the relative location of optical signal paths 2501 and 2502, together with black colored pads 2510 and dotted colored pad 2540 can be clearly seen. The dotted colored pad 2540 is in the middle, while the black colored pads 2510 are placed at sides.

As an example of the significant advantages of FIG. 25 over prior art, assume that the active part of each arm is 0.8 mm long. There are 5 of them, for a total active length of 4 cm, which is enough for most applications. Each arm is divided to four sections and each section to four subsections. Under these configurations, the active length of each section is about 250 μm long, which means its inherent velocity limited bandwidth will be in excess of 300 GHz.

However, breaking sections to 62 μm long subsections means that each electrical driver will only see 25% of the total capacitance of the section. The electrical loss of this small electrode is almost negligible. As a result, silicon based drivers, such as CMOS or BiCMOS, operating at tens of GHz but at low voltage (0.5 to 1.5 V) can then be used to operate the device. Normally in crystal based modulators high voltage compound semiconductor drivers (e.g., GaAs or GaN) operating at 5 V or beyond are used.

Since the dissipated energy of a capacitor is quadratically related to the charging/discharging voltage, this reduction of voltage level by a factor of 3 or more may increase the energy efficiency by over tenfold.

The benefits of the structure, however, go far beyond energy consumption. It can also be significantly cost effective.

For example, GaAs high voltage drivers normally cost in the range of $1000. However, a 1 cm by 1 cm silicon chip in advanced CMOS process, will cost significantly less. Assuming the processed Si wafer cost is $5000, and the wafer has diameter of 300 mm, with a conservative fabrication yield of 50%, roughly 350 good dies will be obtained per wafer, for a cost of roughly $14. Since the silicon chip will be directly bonded on top of the lithium niobate one, the cost of two high frequency packaging (one for the driver and one for the modulator itself) will be now reduced to only one. Therefore, the original $1000 cost of the driver will now be almost entirely saved.

On the other hand, changing the form factor of the modulator from a long device with dimension of 40 mm by 5 mm to the new one with 10 mm by 10 mm, has reduced the chip area by a factor 2, which means twice device count per standard 100 mm LiNbO$_3$ wafer. That means the $10,000 modulator will now be only $5,000. Therefore, the original systems which cost around $11,000 will now be only $5,000 (the cost of electronics is now almost negligible), which is a cost reduction by a factor of more than twofold.

Figure 26:
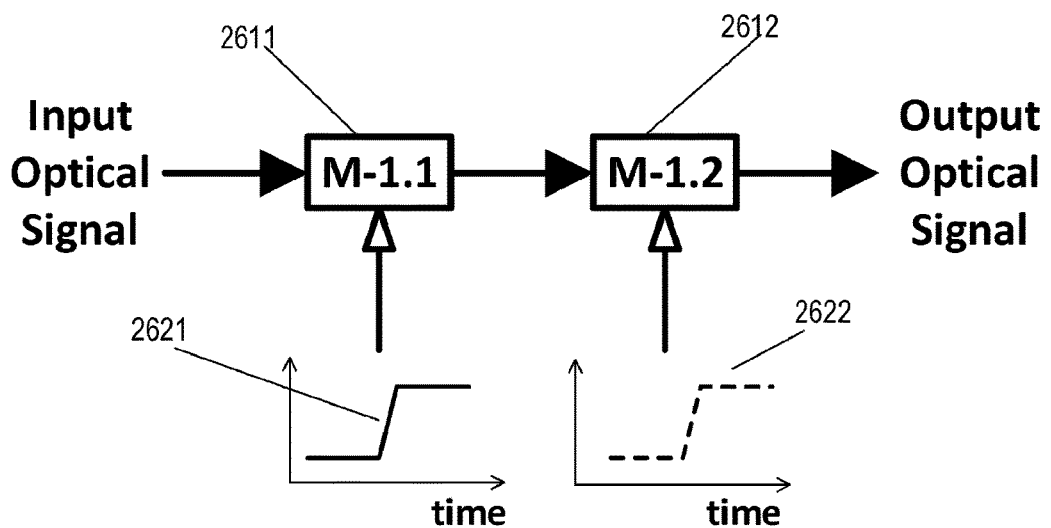
FIG. 26 illustrates the concept of delay minimisation in the context of the current invention.
Figure 26:
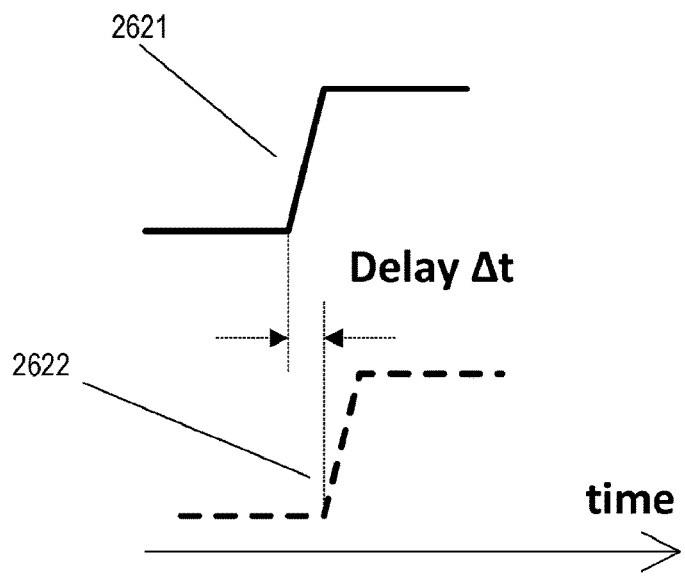

FIG. 26 illustrates the concept of delay in the context of the current invention.

FIG. 26 (a) depicts a simplified schematic of two sub-sections of part of a section of an exemplary embodiment according to the current invention. The electrical signal 2621 drives the optical modulating element M-1.1 within sub-section 1.1 (2611) and electrical signal 2622 drives the optical modulating element M-1.2 within sub-section 1.2 (2612).

FIG. 26 (b) depicts the delay Δt between the two electrical signals 2621 and 2622. It is understood by those skilled in the art that the concept of minimisation of delay in the context of this invention relates to proper configuration of the apparatus such that the delay Δt shown here is substantially minimised. It is further understood that due to variety of reasons including but not limited to imperfections or nonidealities of the fabrication process, or random variations of fabrication parameters, or environmental variations (such as temperature or pressure or humidity) during the operation of the apparatus, the delay Δt shown here may deviate from its nominal designed value.

The signals 2621 and 2622 shown here are bi-level digital electrical signals. However, it is understood by those skilled in the art that this is only for illustrative purposes and the signals can be multi-level discrete time, analog, or other types of signals.

Figure 27:
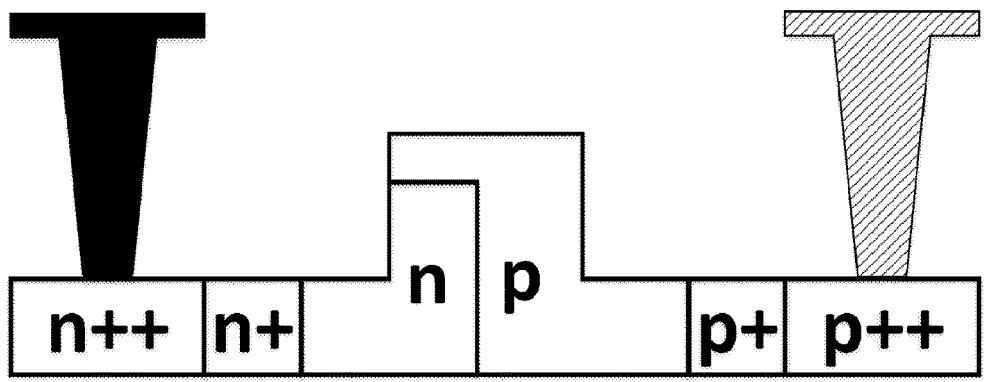
FIG. 27 depicts two more exemplary optical modulating elements.
Figure 27:
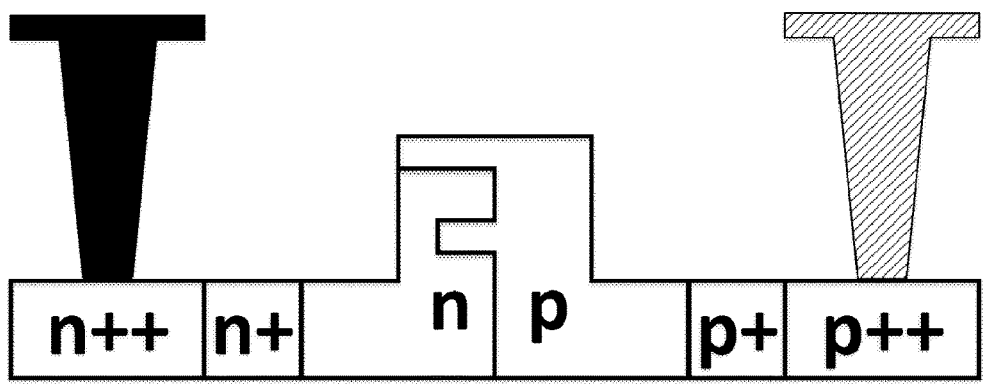

FIG. 27 depicts two more exemplary embodiments that may be used as optical modulating elements. The semiconductor structures shown here are similar to FIG. 14. However, here, it is illustrated that the semiconductor structure does not need to be a simple symmetrical lateral one such as FIG. 14.

FIG. 27 (a) depicts an asymmetric structure wherein the width of the p-type region is wider than the n-type region. The junction is also a combination of lateral and vertical p-n junctions.

FIG. 27 (b) depicts yet another exemplary embodiment that can be used as optical modulating element. Here the semiconductor p-n junction is even more complex than FIG. 27 (b).

It is understood by those skilled in the art that these exemplary p-n junctions, or other structures, can be fabricated by variety of techniques including but not limited to ion implantation utilizing multiple implant dosage and multiple ion energies.

FIG. 28 depicts an exemplary embodiment prior to and in the process of forming an optical modulating element.

FIG. 28 (a) is the cross section view of a semiconductor based optical signal path where an optical modulating element is planned to be formed. After applying appropriate doping levels during semiconductor fabrication process, the cross section view of FIG. 28 (a) is now converted to the cross section view of FIG. 28 (b). FIG. 28 (c) is the top view of FIG. 28 (b).

It is understood by those skilled in the art that this figure is only for illustrative purposes and is only limited to a special case of semiconductor p-n junction based optical modulating element.

Variety of other configurations, as we have discussed in details in other parts of this document, for example, using other doping profiles such as FIG. 27, or using other materials with Pockels effect, or other variations that are not shown here for the sake of brevity are also possible.

FIG. 29 depicts an exemplary embodiment of an optical modulating element. The starting point is the structure of FIG. 28 (b) and FIG. 28 (c). After forming vias 2971 and 2972, followed by forming electrical access layers 2981 and 2982, electrical signals can be applied to the element.

FIG. 29 (a) is the cross sectional view and FIG. 29 (b) is the top section view of the optical modulating element. Here, as it can be seen on FIG. 29 (b) the access layers 2981 and 2982 the vias 2971 and 2972 are all continuously formed along the entire length of the optical modulating element.

Figure 30:
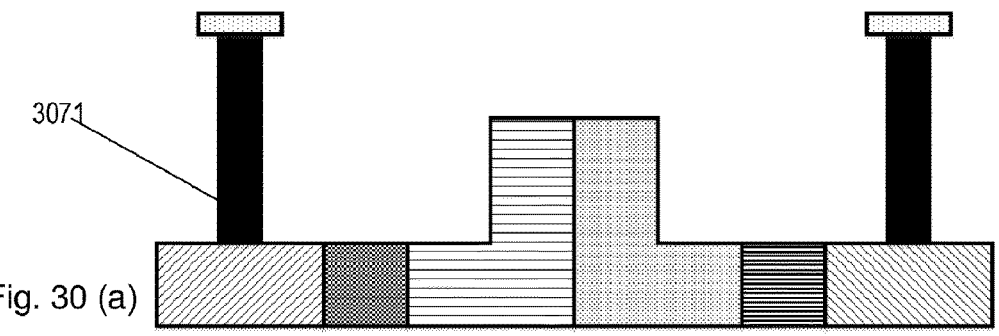
FIG. 30 depicts another exemplary embodiment of an optical modulating element.
Figure 30:
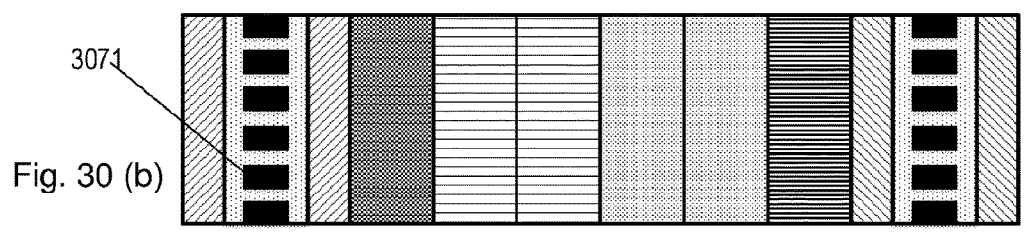

FIG. 30 depicts another exemplary embodiment of an optical modulating element. It is related to FIG. 29, however, here as it can be seen on the top view of FIG. 30 (b), although the access layers are extended along the entire length of the optical modulating element, the vias, such as via 3071 are formed in a discretized fashion. This is in contrast to FIG. 29 where the vias were formed in a continuous fashion. This may have advantages from the viewpoint of semiconductor fabrication process, but it may be disadvantageous from the viewpoint of electrical resistance.

Figure 31:
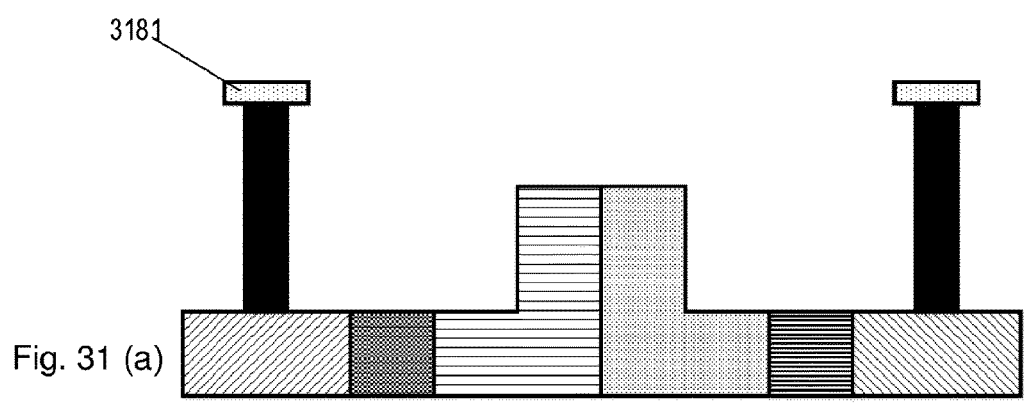
FIG. 31 depicts yet another exemplary embodiment of an optical modulating element.
Figure 31:
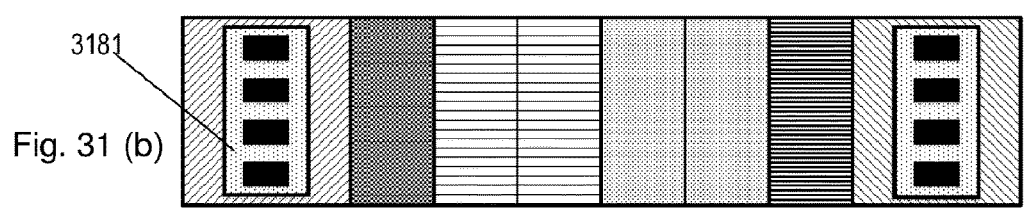

FIG. 31 depicts yet another exemplary embodiment of an optical modulating element. It is related to FIG. 29 and FIG. 30. Here, as it can be seen on the top view of FIG. 31 (b), the vias are formed in a discretized fashion similar to FIG. 30, but unlike FIG. 29 and FIG. 30, the access layers, such as 3181 are shorter than the entire length of the optical modulating element.

Figure 32:
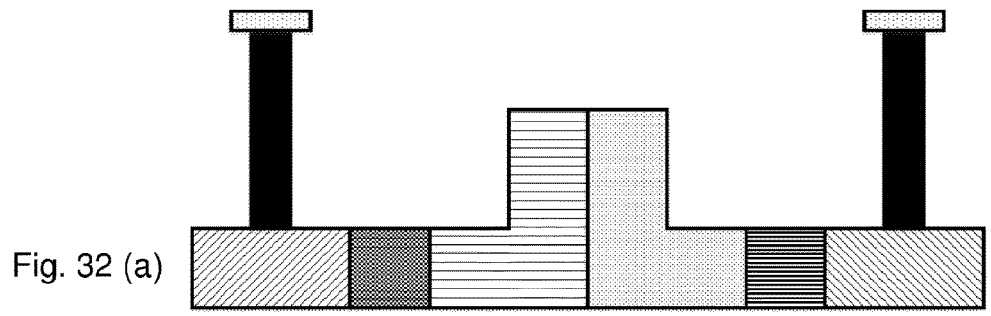
FIG. 32 depicts an exemplary embodiment of a sub-section comprising an optical modulating element.
Figure 32:
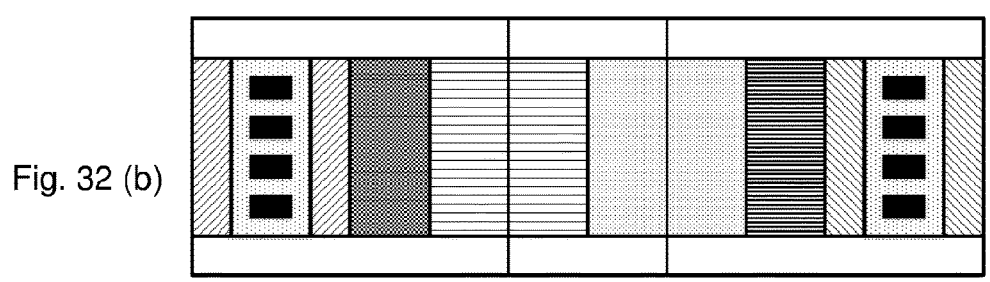

FIG. 32 depicts an exemplary embodiment of a sub-section comprising an optical modulating element.

The optical modulating element in cross section view of FIG. 32 (a) forms part of the subsection, as shown in FIG. 32 (b). Here, as an example, the length of the optical modulating element is shorter than the length of the sub-section, however, this is not a requirement. It is understood by those skilled in the art that varieties of other configurations are possible, which are not shown here for the sake of brevity.

Figure 33:
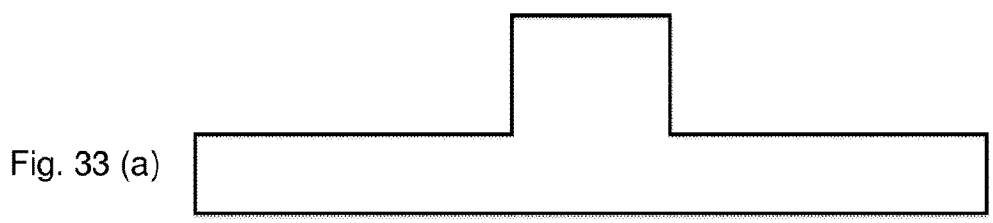
FIG. 33 depicts an exemplary embodiment of two adjacent sub-sections.
Figure 33:
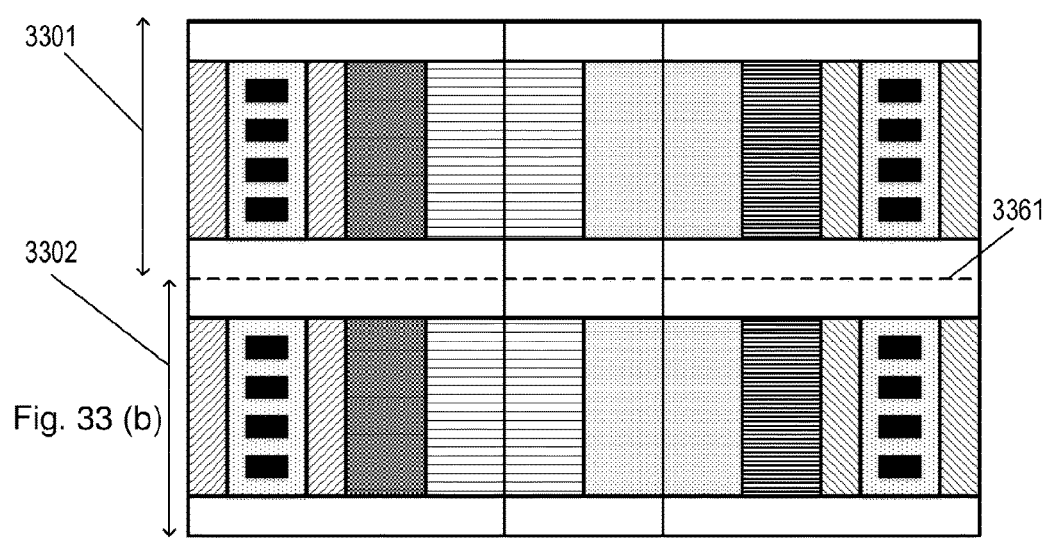

FIG. 33 depicts an exemplary embodiment of two adjacent sub-sections. The top view of the structure is shown in FIG. 33 (b) comprising two sub-sections 3301 and 3302. Each sub-section comprises an optical modulating element. The boundary between sub-sections 3301 and 3302 is defined by the dashed line 3361.

FIG. 33 (a) is the cross section view of the optical signal path at the location of the boundary 3361.

Figure 34:
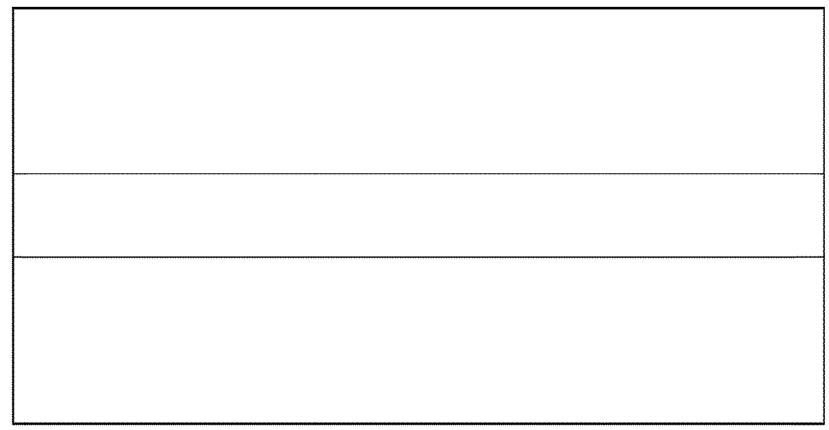
FIG. 34 depicts an exemplary embodiment illustrating the concepts of sections and sub-sections.
Figure 34:
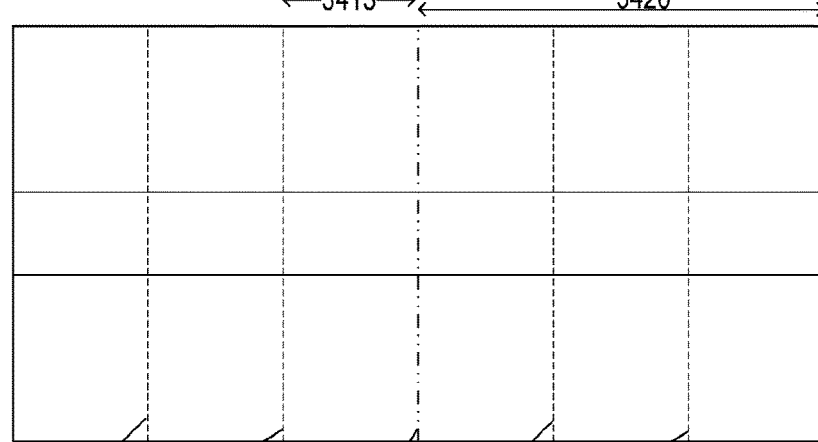
Figure 34:
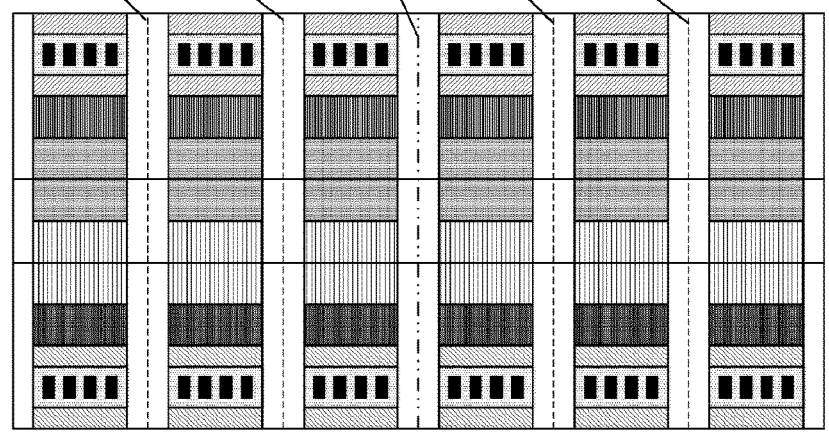

FIG. 34 depicts an exemplary embodiment illustrating the concepts of sections and sub-sections.

The two sections 3410 and 3420 shown on FIG. 34 (b), each comprises three sub-sections. One of the sub-sections, 3413, is enumerated on FIG. 34 (b).

Within section 3410, the boundaries between the three sub-sections are defined by dashed lines 3441 and 3442. Within section 3420, the boundaries between the three sub-sections are defined by dashed lines 3451 and 3452.

The boundary between two sections 3410 and 3420 is defined by dotted-dashed line 3460 on FIG. 34 (b) and FIG. 34 (c).

Figure 35:
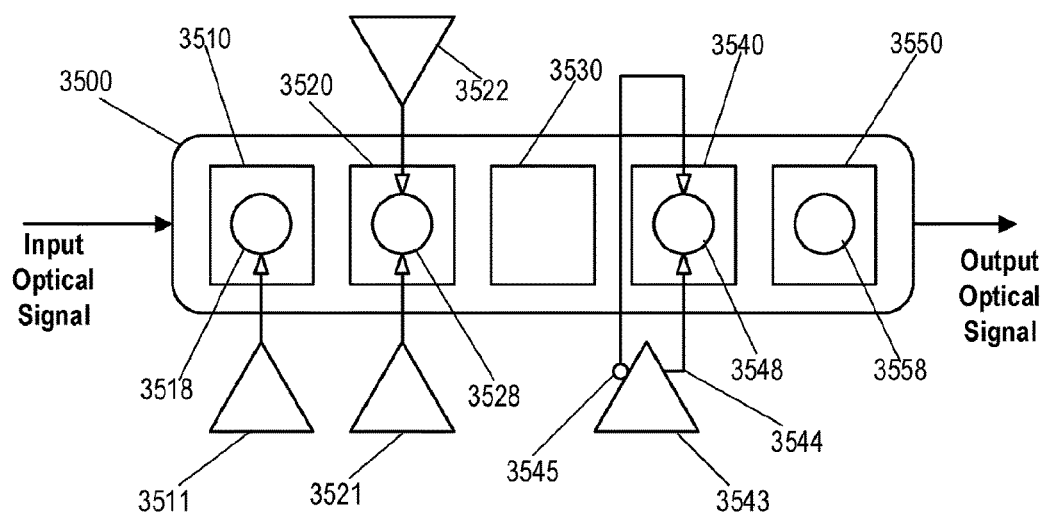
FIG. 35 depicts an exemplary embodiment of a section of an optical signal path together with electrical drivers according to the current invention.

FIG. 35 depicts an exemplary embodiment of a section of an optical signal path together with electrical drivers according to the current invention.

The rounded-corner rectangle 3500 is a section of the optical signal path. The section 3500 comprises five sub-sections 3510, 3520, 3530, 3540, and 3550.

The sub-section 3510 comprises the modulating element 3518. The sub-section 3520 comprises the modulating element 3528. The sub-section 3530 does not comprise a modulating element. The sub-section 3540 comprises the modulating element 3548. The sub-section 3550 comprises the modulating element 3558.

The modulating element 3518 is coupled with the electrical driver 3511. The modulating element 3528 is coupled with two different electrical drivers 3521 and 3522. The modulating element 3548 is coupled with the electrical driver 3543. The modulating element 3548 comprises two electrical ports in which one port is coupled with the normal output 3544 of 3543, and the other port is coupled with the complementary output 3545 of 3543. The modulating element 3558 is not coupled with any electrical driver.

The skilled person will understand that in the preceding description and appended claims, positional terms such as 'above', 'overlap', 'under', 'lateral', etc. are made with reference to conceptual illustrations of an apparatus, such as those showing standard cross-sectional perspectives and those shown in the appended drawings. These terms are used for ease of reference but are not intended to be of limiting nature. These terms are therefore to be understood as referring to an apparatus when in an orientation as shown in the accompanying drawings.

It will be appreciated that all doping polarities mentioned above could be reversed, the resulting devices still being in accordance with the present invention.

Although the invention has been described in terms of preferred embodiments as set forth above, it should be understood that these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination with any other feature disclosed or illustrated herein.

REFERENCES

[1] M. Izutsu, Y. Yamane, and T. Sueta, "Broad-band traveling-wave modulator using a LiNbO3 optical waveguide," *IEEE J. Quantum Electron.*, vol. 13, no. 4, pp. 287-290, April 1977.

[2] L. C. Gunn, R. Koumans, B. Li, G. L. Li, and T. J. Pinguet, "Distributed amplifier optical modulators," U.S. Pat. No. 7,039,258 B2, 2 May 2006.

[3] D. Kucharski, B. Analui, L. C. Gunn, R. Koumans, T. Pinguet, and T. Sadagopan, "Distributed amplifier optical modulators," U.S. Pat. No. 7,450,787 B2, 11 Nov. 2008.

[4] D. Kucharski, B. Analui, L. C. Gunn, R. Koumans, T. Pinguet, and T. Sadagopan, "Distributed amplifier optical modulator," U.S. Pat. No. 7,515,775 B1, 7 Apr. 2009.

[5] D. Kucharski, B. Analui, L. C. Gunn, R. Koumans, T. Pinguet, and T. Sadagopan, "Distributed amplifier optical modulator," U.S. Pat. No. 7,899,276 B2, 1 Mar. 2011.

[6] P. D. Dobbelaere, T. Pinguet, M. Peterson, M. Harrison, A. G. Dickinson, and L. C. Gunn, "Low-cost transceiver approach," U.S. Pat. No. 8,577,191 B2, 5 Nov. 2013.

[7] T. Pinguet, S. Gloeckner, S. Abdalla, S. Mirsaidi, P. D. Dobbelaere, and L. C. G. III, "Method and system for optoelectronics transceivers integrated on a cmos chip," US20130094865 A9, 18 Apr. 2013.

[8] D. Kucharski, B. Welch, and S. Abdalla, "Method and system for encoding multi-level pulse amplitude modulated signals using integrated optoelectronic devices," U.S. Pat. No. 8,665,508 B2, 4 Mar. 2014.

[9] D. Kucharski, B. Welch, and S. Abdalla, "Method and system for encoding multi-level pulse amplitude modulated signals using integrated optoelectronic devices," US20140186028 A1, 3 Jul. 2014.

[10] B. Welch and D. Kucharski, "Method and system for split voltage domain transmitter circuits," U.S. Pat. No. 8,687,981 B2, 1 Apr. 2014.

[11] D. Kucharski, B. Welch, and S. Abdalla, "Method and circuit for encoding multi-level pulse amplitude modulated signals using integrated optoelectronic devices," U.S. Pat. No. 8,238,014 B2, 7 Aug. 2012.

[12] D. M. Gill, W. M. Green, and A. V. Garcia, "Electro-optic modulator," US20140064653 A1, 6 Mar. 2014.

[13] D. M. Gill, W. M. Green, and A. V. Garcia, "Electro-optic modulator," US20140061450 A1, 6 Mar. 2014.

[14] W. M. Green, J. C. Rosenberg, and Y. A. Vlasov, "Double Layer Interleaved P-N Diode Modulator," US20130344634 A1, 26 Dec. 2013.

[15] W. M. Green, A. V. Rylyakov, C. S. Schow, and Y. A. Vlasov, "Low distortion high bandwidth adaptive transmission line for integrated photonics applications," U.S. Pat. No. 8,530,821 B2, 10 Sep. 2013.

[16] E. S. T. Milani, M. Repossi, and D. Baldi, "Driver for multi-stage wave guide modulator and method," U.S. Pat. No. 8,989,601 B2, 24 Mar. 2015.

[17] M. Zuffada, E. S. T. Milani, and A. Fincato, "Driver for high speed electrical-optical modulator interface," U.S. Pat. No. 9,018,984 B2, 28 Apr. 2015.

[18] T. Kato, "Optical modulator module and method for modulating optical signal," U.S. Pat. No. 8,744,219 B2, 3 Jun. 2014.

[19] T. Kato, "Optical modulator module and method for modulating optical signal," US20120251032 A1, 4 Oct. 2012.

[20] T. Kato, "Optical modulator module, integrated circuit for driving optical modulator, and method for modulating optical signal," US20140169723 A1, 19 Jun. 2014.

[21] T. Kato, "Optical modulator module and modulation method for optical signal," US20140233962 A1, 21 Aug. 2014.

[22] H. Noguchi, "Optical phase modulation circuit and optical phase modulation method," US20130176609 A1, 11 Jul. 2013.

[23] T. Yamase, M. Sato, H. Uchida, H. Noguchi, K. Sato, and T. Kato, "10-Gb/s in-line centipede electrode InP MZM and low-power CMOS driver with quasi-traveling wave generation," in *Opto-Electronics and Communications Conference (OECC)*, 2011 16th, 2011, pp. 61-62.

[24] T. Kato, "InP modulators with linear accelerator like segmented electrode structure," presented at the Optical Fiber Communications Conference (OFC), 2014, p. Tu3H.1.

[25] S. Akiyama, H. Itoh, S. Sekiguchi, S. Hirose, T. Takeuchi, A. Kuramata, and T. Yamamoto, "InP-Based Mach-Zehnder Modulator With Capacitively Loaded Traveling-Wave Electrodes," *J. Light. Technol.*, vol. 26, no. 5, pp. 608-615, March 2008.

[26] P. M. Mosinskis, R. K. Montgomery, and P. Gothoskar, "Segmented optical modulator," U.S. Pat. No. 7,515,778 B2, 7 Apr. 2009.

[27] U. D. F. Keil, "Propagation delay variation for a distributed optical modulator driver," U.S. Pat. No. 7,317,846 B2, 8 Jan. 2008.

[28] R. Lefevre and P. Pecci, "Integrated optoelectronic device comprising an electroabsorption modulator and an electronic element for controlling the modulator," US20040246557 A1, 9 Dec. 2004.

[29] A. H. Nejadmalayeri, "Tree network topology electrode semiconductor optical modulator," http://www.kipo.go.kr/kpo/user.tdf?a=user.etc.cyberPost.BoardUserApp&c=2004&catmenu=m04_05_02&cp=8&npp=10&pg=1&sn=62&year=2014, 31 Mar. 2014.
[30] N. Pavarelli, J. S. Lee, M. Rensing, C. Scarcella, S. Zhou, P. Ossieur, and P. A. O'Brien, "Optical and Electronic Packaging Processes for Silicon Photonic Systems," *J. Light. Technol.*, vol. 33, no. 5, pp. 991-997, March 2015.
[31] P. Rabiei, "Method for production of optical waveguides and coupling and devices made from the same," U.S. Pat. No. 9,111,730 B2, 18 Aug. 2015.
[32] J.-S. Choi and K. Lee, "Design of CMOS tapered buffer for minimum power-delay product," *IEEE J. Solid-State Circuits*, vol. 29, no. 9, pp. 1142-1145, September 1994.
[33] D. Patel, S. Ghosh, M. Chagnon, A. Samani, V. Veerasubramanian, M. Osman, and D. V. Plant, "Design, analysis, and transmission system performance of a 41 GHz silicon photonic modulator," *Opt. Express*, vol. 23, no. 11, p. 14263, June 2015.

The invention claimed is:
1. An apparatus comprising:
a plurality of electrical drivers; and
at least one optical signal path comprising a plurality of sections, wherein at least one section comprises a plurality of sub-sections, wherein at least some of the plurality of sub-sections each comprise an optical modulating element, wherein at least some of the optical modulating elements each are coupled with at least one of said plurality of electrical drivers,
wherein said each coupled electrical driver is configured to generate at least one electrical signal for modulating at least one of propagation properties of an optical signal through said at least one optical signal path, and
wherein the electrical drivers are configured such that a time delay difference between the electrical signals generated by at least two electrical drivers coupled with the optical modulating elements of respective sub-sections within said at least one section of said at least one optical signal path is smaller than or equal to seventy percent of the time-of-flight of an optical signal through said at least one section of said at least one optical signal path.
2. An apparatus according to claim 1, wherein the optical signal path further comprises at least one group comprising at least two of said plurality of sections; and
further comprising electrical circuit comprising said plurality of electrical drivers; and
optionally, wherein the electrical circuit comprises an electrical network selected from a group comprising Daisy Chain network, Line network, Bus network, Tree network, and Star network; and
wherein said electrical circuit comprises at least one electrical signal input port and a plurality of electrical signal output ports; and
optionally, wherein the number of electrical signal output ports is equal to or greater than the number of subsections each comprising an optical modulating element of the optical signal path,
wherein said at least one electrical signal input port is configured to supply an electrical signal to optical modulating elements within said at least one group of the optical signal path,
wherein said at least one electrical signal input port comprises separate electrical signal input ports provided for separate groups of the optical signal path.
3. An apparatus according to claim 1, further comprising at least one delay element between drivers driving the respective coupled modulating elements of at least two sections of the optical signal path,
wherein the delay element is configured to control the delay between the said electrical signals generated by drivers driving the respective coupled optical modulating elements of two adjacent sections of the optical signal path; and
wherein the delay element is configured such that the delay between at least two of said electrical signals generated by drivers driving the respective coupled optical modulating elements within at least one section of the optical signal path is substantially minimised; or
wherein the delay element is configured to provide a substantially constant delay between said electrical signals generated by the electrical drivers driving the respective coupled optical modulating elements within each section of the optical signal path; or
wherein the delay element is configured to provide a controllable delay between said electrical signals generated by the electrical drivers driving the respective coupled optical modulating elements within each section of the optical path.
4. An apparatus according to claim 3, wherein the delay element comprises electronic delay circuitry; or
wherein the delay element is a passive delay element comprising a transmission line.
5. An apparatus according to claim 1, wherein the optical modulating elements each comprising a controllable optical property; and
wherein the controllable optical property comprises at least one of the following: refractive index, absorption coefficient, index ellipsoid, a combination of refractive index and absorption coefficient, and a combination of index ellipsoid and absorption coefficient.
6. An apparatus according to claim 1, wherein the optical signal path comprises an optical waveguide, or
wherein the optical signal propagating through the optical signal path is not a guided wave.
7. An apparatus according to claim 1, wherein the electrical drivers coupled with at least two subsections within said at least one section of the optical signal path are synchronised with one another.
8. An apparatus according to claim 1, wherein the optical modulating element comprises a semiconductor material; and
wherein the semiconductor material comprises at least one of the following materials: silicon, germanium, silicon germanium, gallium arsenide, indium phosphide, and gallium nitride; or
wherein the optical modulating element comprises a ferroelectric crystal material; and
wherein the ferroelectric crystal material comprises at least one of the following materials: Lithium Niobate, Barium Titanate, and Potassium Titanyl Phosphate; or
wherein the optical modulating element comprises a material comprising electro-optic polymer.
9. An apparatus according to claim 1, wherein the optical signal path comprises a meandered shape; or wherein the optical signal path comprises a first portion and a second meandered portion, wherein the first portion comprises at least some of the plurality of optical modulating elements each comprising first and second electrical input ports, and the second meandered portion comprises the remaining of the plurality of optical modulating elements each comprising first and second electrical input ports.

10. An apparatus according to claim 9, wherein the second meandered portion is bent in about 180° in respect of the first portion; and
   wherein the signal polarity of the first and second electrical input ports located within the first portion of the optical signal path is opposite to the signal polarity of the first and second electrical input ports of the second meandered portion of the optical signal path.

11. An apparatus according to claim 10, wherein the optical modulating element comprises a ferroelectric crystal material; and
   wherein the ferroelectric crystal material comprises at least one of the following materials: Lithium Niobate, Barium Titanate, and Potassium Titanyl Phosphate.

12. An apparatus according to claim 1: (A) wherein the optical modulating element comprises a first semiconductor region, a second semiconductor region, a third semiconductor region, and a fourth semiconductor region, wherein the first semiconductor region is adjacent to the second semiconductor region, and the third semiconductor region is adjacent to the fourth semiconductor region;
   wherein the at least one optical signal path comprises a first optical signal path and a second optical signal path, wherein the first optical signal path comprises the first and second semiconductor regions, and the second optical signal path comprises the third and fourth semiconductor regions;
   wherein the optical modulating element comprises at least two electrical signal ports; and
   wherein the first and fourth semiconductor regions comprise n-type semiconductors, and the second and third semiconductor regions comprise p-type semiconductors; or
   wherein the first and fourth semiconductor regions comprise p-type semiconductors, and the second and third semiconductor regions comprise n-type semiconductors; or
   (B) wherein the optical modulating element comprises a first semiconductor region, a second semiconductor region, a third semiconductor region, a fourth semiconductor region, a fifth semiconductor region, and a sixth semiconductor region, wherein the fifth semiconductor region is sandwiched between the first and second semiconductor regions, and the sixth semiconductor region is sandwiched between the third and fourth semiconductor regions; and
   wherein the fifth and sixth semiconductor regions comprise intrinsic semiconductors; and
      wherein the first and fourth semiconductor regions comprise n-type semiconductors, and the second and third semiconductor regions comprise p-type semiconductors; or
         wherein the first and fourth semiconductor regions comprise p-type semiconductors, and the second and third semiconductor regions comprise n-type semiconductors;
   wherein the optical signal path comprises a first optical signal path and a second optical signal path, wherein the first optical signal path comprises the first, second, and fifth semiconductor regions, and the second optical signal path comprises the third, fourth, and sixth semiconductor regions.

13. An apparatus according to claim 1, wherein the optical modulating element comprises at least two semiconductor regions and a trench region formed between the two semiconductor regions; and
   optionally, wherein the trench region is at least partially filled with a polymer material having Pockels effect.

14. An apparatus according to claim 1, further comprising a signal processor.

15. An apparatus according to claim 1, wherein the electrical drivers are formed on an electrical chip and the optical modulating elements are formed on an optical chip; and
   wherein the electrical chip and optical modulating elements are connected using at least one of the following techniques: copper pillar technique, flip chip bonding technique, through-silicon via (TSV) technique, and fan-out wafer level packaging (FOWLP) technique; and/or
   wherein the optical chip comprises at least one passive electrical element comprising at least one electrical transmission line.

16. An apparatus according to claim 1, wherein the electrical drivers and the optical modulating elements are formed on the same chip.

17. An apparatus according claim 1, wherein the optical modulating element comprises a p-n semiconductor structure comprising electrical signal ports; or
   wherein the optical modulating element comprises a p-i-n semiconductor structure comprising electrical signal ports, wherein the p-i-n structure comprises an intrinsic layer sandwiched between the p and n regions.

18. An apparatus for generating a modulated optical signal, comprising:
   a plurality of electrical drivers;
   at least one optical signal path comprising a plurality of groups, wherein at least one group comprises a plurality of sections, wherein at least one section comprises a plurality of sub-sections, wherein at least some of the plurality of sub-sections each comprise an optical modulating element, wherein at least some of the optical modulating elements each are coupled with at least one of said plurality of electrical drivers,
   wherein said each coupled electrical driver is configured to generate at least one electrical signal for modulating at least one of propagation properties of an optical signal through said at least one optical signal path, and
   wherein the electrical drivers are configured such that a time delay difference between the electrical signals generated by at least two electrical drivers coupled with the optical modulating elements of respective sub-sections within said at least one section within said at least one group of said at least one optical signal path is smaller than or equal to seventy percent of the time-of-flight of an optical signal through said at least one section within said at least one group of said at least one optical signal path.

19. An apparatus according to claim 18, further comprising at least one delay element between the electrical drivers driving the coupled modulating elements of respective sub-sections of at least two sections within said at least one group of said at least one optical signal path, and/or
   further configured to provide some delay between said electrical signals driving the respective coupled modulating elements of at least two sections within said at least one group of said at least one optical signal path.

20. An apparatus comprising at least one optical interferometer, wherein said at least one optical interferometer further comprises at least one apparatus according to claim 18.

21. An apparatus according to claim 18, wherein the apparatus is configured to generate at least one of the following modulated optical signals: M-ary phase shift keying (M-ary PSK), multi-level phase modulation, M-ary quadrature amplitude modulation (M-ary QAM), and M-ary amplitude shift keying (M-ary ASK) modulated optical signal; and/or
wherein the apparatus is configured to generate multi-level pulse amplitude modulated (PAM) optical signal.

22. A Mach-Zehnder interferometer comprising:
an optical splitter comprising at least one input waveguide and at least two output waveguides;
an optical recombiner comprising at least two input waveguides and at least one output waveguide; and
at least two interferometer arms, each optically coupled between one of the output waveguides of the optical splitter and one of the input waveguides of the optical recombiner, wherein at least one arm comprises the apparatus of claim 18.

23. A Sagnac interferometer comprising:
an optical splitter/combiner comprising at least one input waveguide and at least two input/output waveguides; and
at least one interferometer arm, each optically coupled between one of said at least two input/output waveguides of the optical splitter/combiner and another one of said at least two input/output waveguides of the optical splitter/recombiner,
wherein the at least one interferometer arm comprises the apparatus of claim 18.

24. An apparatus according to claim 18, wherein separate electrical signal input ports are provided for separate groups.

25. An apparatus according to claim 18, wherein each optical modulating element comprises a controllable optical property, wherein the controllable optical property comprises at least one of the following properties: refractive index, absorption coefficient, birefringence, index ellipsoid, a combination of refractive index and absorption coefficient, a combination of birefringence and absorption coefficient, and a combination of index ellipsoid and absorption coefficient.

26. A method of manufacturing an apparatus, the method comprising:
forming an optical signal path;
dividing the optical signal path into a plurality of sections;
dividing at least one section into a plurality of sub-sections;
forming an optical modulating element within each sub-section;
providing a plurality of electrical drivers each generating at least one electrical signal for modulating at least one of propagation properties of an optical signal through the optical signal path;
coupling each optical modulating element with at least one of the plurality of electrical drivers; and
providing a time delay difference between the electrical signals generated by at least two electrical drivers driving the optical modulating elements of respective sub-sections within said at least one section of the optical signal path that is smaller than or equal to seventy percent of the time-of-flight of an optical signal through said at least one section of said at least one optical signal path.

27. A method according to claim 26, further providing at least one electrical delay element between electrical drivers driving two sections of the optical signal path; and/or
further providing at least some delay between electrical signals driving the respective coupled optical modulating elements within at least two sections of the optical signal path; and
further comprising forming the electrical drivers on an electrical chip and forming the optical modulating elements on an optical chip; and
further comprising connecting the electrical chip and optical modulating elements using at least one of the following techniques: copper pillar technique, flip-chip bonding technique, through-silicon via (TSV) technique, and fan-out wafer level packaging (FOWLP) technique; or
wherein the electrical drivers and the optical modulating elements are formed on the same chip.

* * * * *